United States Patent
Han et al.

(10) Patent No.: US 9,184,869 B2
(45) Date of Patent: Nov. 10, 2015

(54) METHOD AND APPARATUS FOR TRANSMITTING CONTROL INFORMATION IN A WIRELESS COMMUNICATION SYSTEM

(75) Inventors: Seunghee Han, Anyang-si (KR); Jaehoon Chung, Anyang-si (KR); Hyunwoo Lee, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 298 days.

(21) Appl. No.: 13/695,607

(22) PCT Filed: Jul. 7, 2011

(86) PCT No.: PCT/KR2011/004952
§ 371 (c)(1),
(2), (4) Date: Oct. 31, 2012

(87) PCT Pub. No.: WO2012/005516
PCT Pub. Date: Jan. 12, 2012

(65) Prior Publication Data
US 2013/0044667 A1 Feb. 21, 2013

Related U.S. Application Data

(60) Provisional application No. 61/361,925, filed on Jul. 7, 2010, provisional application No. 61/373,275, filed on Aug. 13, 2010.

(51) Int. Cl.
*H04L 1/00* (2006.01)
*H04L 5/00* (2006.01)

(52) U.S. Cl.
CPC .............. *H04L 1/0025* (2013.01); *H04L 5/0053* (2013.01)

(58) Field of Classification Search
CPC ..... H04W 52/02; H04W 28/04; H04W 84/08; H04L 1/0025; H04L 5/0053
USPC .......................................... 370/311, 329, 341
See application file for complete search history.

(56) References Cited

U.S. PATENT DOCUMENTS

| 7,564,827 B2 * | 7/2009 | Das et al. ..................... 370/342 |
| 8,638,729 B2 * | 1/2014 | Pajukoski et al. ............ 370/329 |

(Continued)

FOREIGN PATENT DOCUMENTS

| CN | 101646237 | 2/2010 |
| CN | 101674164 | 3/2010 |

(Continued)

OTHER PUBLICATIONS

The State Intellectual Property Office of the People's Republic of China Application Serial No. 201180021527.7, Office Action dated Jul. 21, 2014, 5 pages.

(Continued)

*Primary Examiner* — Mark Rinehart
*Assistant Examiner* — Natali N Pascual Peguero
(74) *Attorney, Agent, or Firm* — Lee, Hong, Degerman, Kang & Waimey

(57) ABSTRACT

The present invention relates to a method in which a terminal transmits control information in a wireless communication system, comprising the following steps: selecting a PUCCH resource for control information from among a plurality of PUCCH resources; transmitting, through the selected PUCCH resources, a PUCCH signal carrying the modulation value corresponding to the control information; and transmitting a reference signal for the demodulation of the PUCCH signal, wherein the control information is identified by a combination of the PUCCH resource and resources for the modulation value and the reference signal.

12 Claims, 29 Drawing Sheets

(56) References Cited

U.S. PATENT DOCUMENTS

2010/0210256 A1* 8/2010 Shen et al. ............... 455/422.1
2010/0303011 A1* 12/2010 Pan et al. .................. 370/328

FOREIGN PATENT DOCUMENTS

| KR | 1020090111250 | 10/2009 |
| KR | 1020100017039 | 2/2010 |
| KR | 1020100058396 | 6/2010 |
| KR | 1020100058399 | 6/2010 |

OTHER PUBLICATIONS

PCT International Application No. PCT/KR2011/004952, International Search Report, dated Feb. 8, 2012, 11 pages.

* cited by examiner

FIG. 5
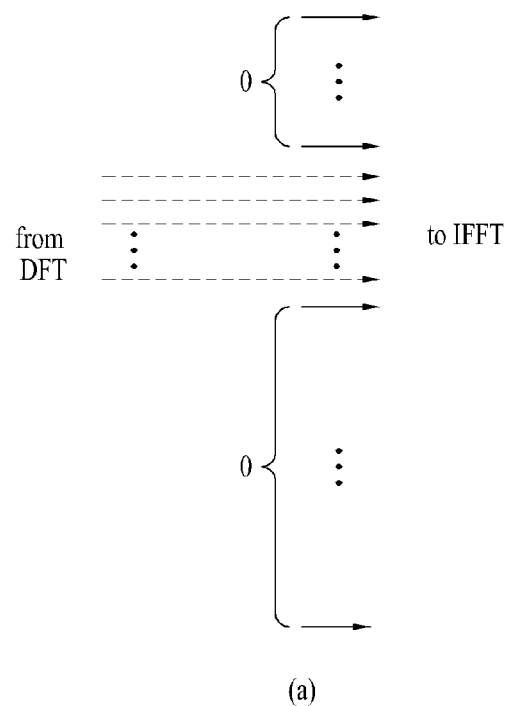
(a)
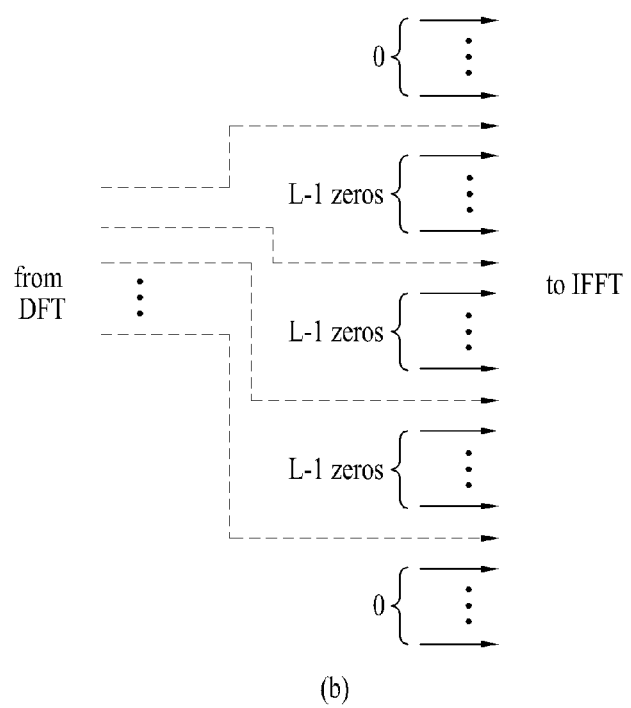
(b)

PUCCH format 1a and 1b structure (normal CP case)

PUCCH format 1a and 1b structure (extended CP case)

PUCCH format 2,2a and 2b structure (normal CP case)

PUCCH format 2,2a and 2b structure (extended CP case)

FIG. 17

Resource allocation: 18 ACK/NACK channels with normal CP $\wedge_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\overline{n}_{OC} = 0$ | $\overline{n}_{OC} = 1$ | $\overline{n}_{OC} = 2$ | $n_{OC} = 0$ | $n_{OC} = 1$ | $n_{OC} = 2$ |
| $n_{CS} = 1$ | $n_{CS} = 0$ | | | | | | |
| 2 | 1 | n'=0 | | 12 | n'=0 | 6 | 12 |
| 3 | 2 | 1 | 6 | 13 | 1 | 7 | 13 |
| 4 | 3 | 2 | 7 | 14 | 2 | 8 | 14 |
| 5 | 4 | 3 | 8 | 15 | 3 | 9 | 15 |
| 6 | 5 | 4 | 9 | 16 | 4 | 10 | 16 |
| 7 | 6 | 5 | 10 | 17 | 5 | 11 | 17 |
| 8 | 7 | | 11 | | | | |
| 9 | 8 | | | | | | |
| 10 | 9 | | | | | | |
| 11 | 10 | | | | | | |
| 0 | 11 | | | | | | |

$\wedge_{shift}^{PUCCH} \in \{1, 2, 3\}$ for normal cyclic prefix  $\{1, 2, 3\}$ for extended cyclic prefix — Orthogonal sequence index for ACK/NACK $\delta_{offset}^{PUCCH} \in \{0, 1, ..., \wedge_{shift}^{PUCCH} - 1\}$ Cell specific cyclic shift offset Cell-specific Cyclic shift value of CAZAC sequence

- $n_{OC}$ : Orthogonal sequence index for ACK/NACK
- $\overline{n}_{OC}$ : Orthogonal sequence index for RS
- $n_{CS}$ : Cyclic shift value of a CAZAC sequence
- n' : ACK/NACK resource index used for the channelization in a RB FIG. 33
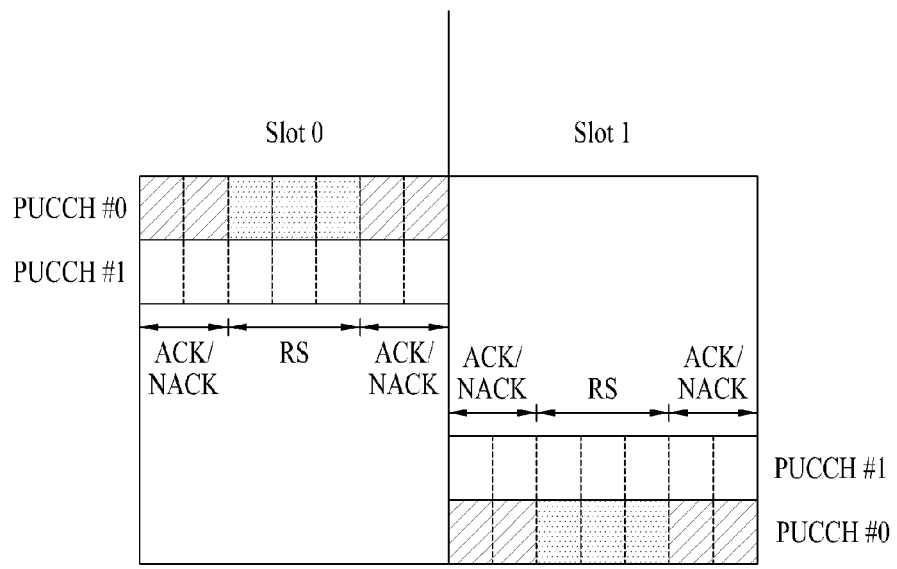
(a)
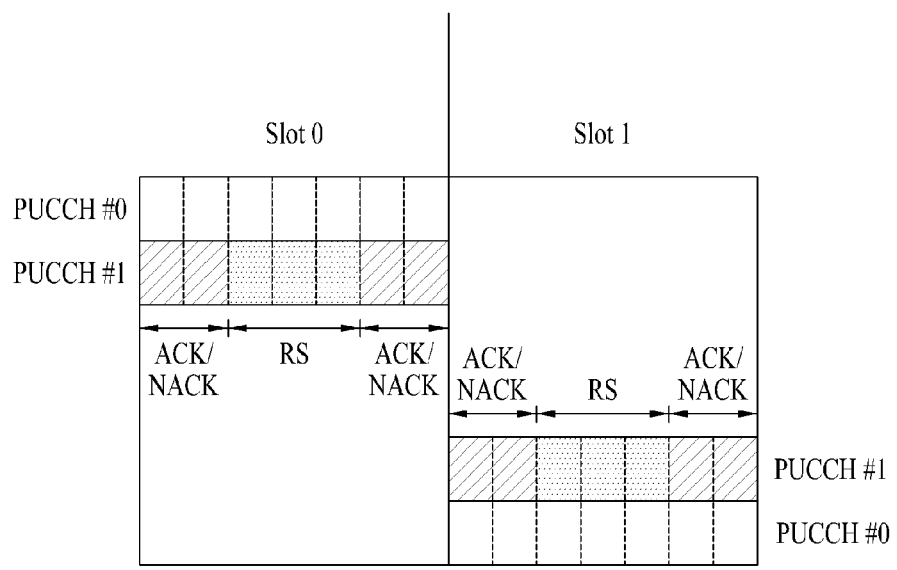
(b)

FIG. 34
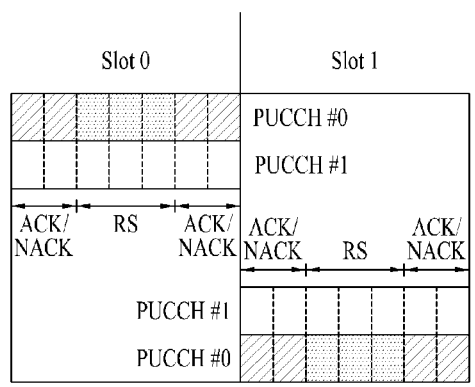
(a)
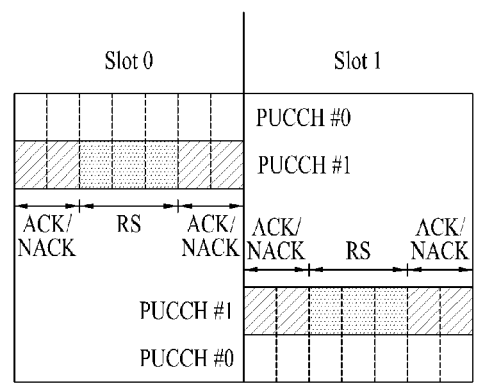
(a)
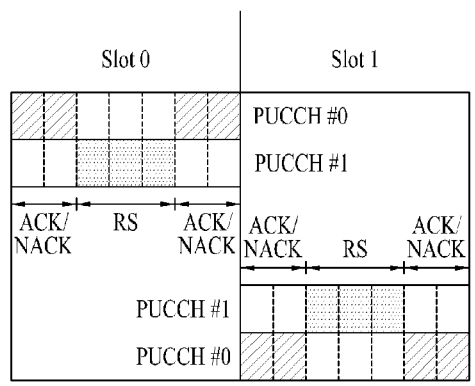
(c)
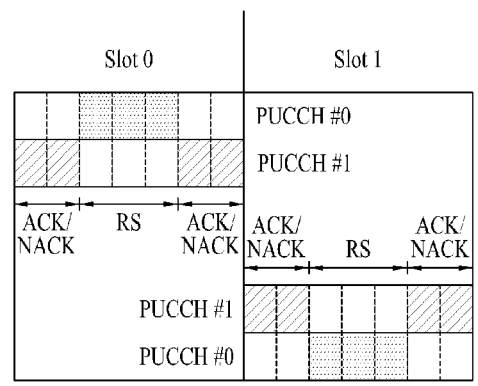
(d)

FIG. 35

| SR | ACK/NACK | Ch1 RS | Ch1 Data | Ch2 RS | Ch2 Data | Ch3 RS | Ch3 Data | Ch4 RS | Ch4 Data |
|---|---|---|---|---|---|---|---|---|---|
| 0 | N, N, N, N | 1 | 1 | 0 | 0 | 0 | 0 | 0 | 0 |
| 0 | N, N, N, A | 1 | -1 | 0 | 0 | 0 | 0 | 0 | 0 |
| 0 | N, N, A, N | 0 | 0 | 1 | 1 | 0 | 0 | 0 | 0 |
| 0 | N, N, A, A | 0 | 0 | 1 | -1 | 0 | 0 | 0 | 0 |
| 0 | N, A, N, N | 0 | 0 | 0 | 0 | 1 | 1 | 0 | 0 |
| 0 | N, A, N, A | 0 | 0 | 0 | 0 | 1 | -1 | 0 | 0 |
| 0 | N, A, A, N | 0 | 0 | 0 | 0 | 0 | 0 | 1 | 1 |
| 0 | N, A, A, A | 0 | 0 | 0 | 0 | 0 | 0 | 1 | -1 |
| 0 | A, N, N, N | 0 | 1 | 1 | 0 | 0 | 0 | 0 | 0 |
| 0 | A, N, N, A | 0 | -1 | 1 | 0 | 0 | 0 | 0 | 0 |
| 0 | A, N, A, N | 0 | 0 | 0 | 1 | 1 | 0 | 0 | 0 |
| 0 | A, N, A, A | 0 | 0 | 0 | -1 | 1 | 0 | 0 | 0 |
| 0 | A, A, N, N | 0 | 0 | 0 | 0 | 0 | 1 | 1 | 0 |
| 0 | A, A, N, A | 0 | 0 | 0 | 0 | 0 | -1 | 1 | 0 |
| 0 | A, A, A, N | 1 | 0 | 0 | 0 | 0 | 0 | 0 | 1 |
| 0 | A, A, A, A | 1 | 0 | 0 | 0 | 0 | 0 | 0 | -1 |
| 0 | N, N, N, N | 0 | 1 | 0 | 0 | 1 | 0 | 0 | 0 |
| 0 | N, N, N, A | 0 | -1 | 0 | 0 | 1 | 0 | 0 | 0 |
| 0 | N, N, A, N | 0 | 0 | 0 | 1 | 0 | 0 | 1 | 0 |
| 0 | N, N, A, A | 0 | 0 | 0 | -1 | 0 | 0 | 1 | 0 |
| 0 | N, A, N, N | 1 | 0 | 0 | 0 | 1 | 0 | 0 | 0 |
| 0 | N, A, N, A | 1 | 0 | 0 | 0 | -1 | 0 | 0 | 0 |
| 0 | N, A, A, N | 0 | 0 | 1 | 0 | 0 | 0 | 0 | 1 |
| 0 | N, A, A, A | 0 | 0 | 1 | 0 | 0 | 0 | 0 | -1 |
| 0 | A, N, N, N | 0 | 1 | 0 | 0 | 0 | 0 | 1 | 0 |
| 0 | A, N, N, A | 0 | -1 | 0 | 0 | 0 | 0 | 1 | 0 |
| 0 | A, N, A, N | 1 | 0 | 0 | 1 | 0 | 0 | 0 | 0 |
| 0 | A, N, A, A | 1 | 0 | 0 | -1 | 0 | 0 | 0 | 0 |
| 0 | A, A, N, N | 0 | 0 | 1 | 0 | 0 | 1 | 0 | 0 |
| 0 | A, A, N, A | 0 | 0 | 1 | 0 | 0 | -1 | 0 | 0 |
| 0 | A, A, A, N | 0 | 0 | 0 | 0 | 1 | 0 | 0 | 1 |
| 0 | A, A, A, A | 0 | 0 | 0 | 0 | 1 | 0 | 0 | -1 |

METHOD AND APPARATUS FOR TRANSMITTING CONTROL INFORMATION IN A WIRELESS COMMUNICATION SYSTEM

CROSS-REFERENCE TO RELATED APPLICATIONS

This application is the National Stage filing under 35 U.S.C. 371 of International Application No. PCT/KR2011/004952, filed on Jul. 7, 2011, which claims the benefit of U.S. Provisional Application Ser. No. 61/361,925, filed on Jul. 7, 2010, and U.S. Provisional Application Ser. No. 61/373,275 filed on Aug. 13, 2010, the contents of which are all hereby incorporated by reference herein in their entirety.

TECHNICAL FIELD

The present invention relates to a wireless communication system, and more particularly, to a method and apparatus for transmitting control information. The wireless communication system can support Carrier Aggregation (CA).

BACKGROUND ART

Wireless communication systems have been widely deployed to provide various types of communication services including voice or data. In general, a wireless communication system is a multiple access system that can support communication for multiple users by sharing available system resources (a bandwidth, transmission power, etc.). Multiple access systems are, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention is to provide a method and apparatus for efficiently transmitting control information in a wireless communication system. Another object of the present invention is to provide a channel format and a signal processing method and apparatus, for efficient transmission of control information. A further object of the present invention is to provide a method and apparatus for efficiently allocating resources in which control information will be transmitted.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for transmitting control information at a User Equipment (UE) in a wireless communication system includes selecting a Physical Uplink Control CHannel (PUCCH) resource for the control information from among a plurality of PUCCH resources, transmitting a PUCCH signal carrying a modulated value corresponding to the control information in the selected PUCCH resource, and transmitting a Reference Signal (RS) for demodulating the PUCCH signal. The control information is identified by a combination of the PUCCH resource, the modulated value, and a resource for the RS.

The control information may include Scheduling Request (SR) information.

The control information may include ACKnowledgment/Negative ACKnowledgment (ACK/NACK) information.

The control information may include a plurality of types of uplink control information.

In another aspect of the present invention, an apparatus for transmitting control information in a wireless communication system includes a transmitter, and a processor for selecting a PUCCH resource for the control information from among a plurality of PUCCH resources, transmitting a PUCCH signal carrying a modulated value corresponding to the control information in the selected PUCCH resource by controlling the transmitter, and transmitting an RS for demodulating the PUCCH signal by controlling the transmitter. The control information is identified by a combination of the PUCCH resource, the modulated value, and a resource for the RS.

The control information may include SR information.

The control information may include ACK/NACK information.

The control information may include a plurality of types of uplink control information.

In another aspect of the present invention, a method for transmitting, by a User Equipment (UE), ACK/NACK information in a wireless communication system includes detecting at least one control channel on a plurality of component carriers, receiving at least one data indicated by downlink control information that the at least one control channel carries, and transmitting the ACK/NACK information associated with the at least one data through SR PUCCH (Scheduling Request Physical Uplink Control Channel) resource. The downlink control information includes a number of control channels assigned to the user equipment, and the ACK/NACK information includes information on a number of ACK/NACKs corresponding to the at least one data within the plurality of component carriers.

In a further aspect of the present invention, an apparatus of transmitting ACK/NACK information in a wireless communication system includes a transmitter, a receiver, and a processor configured to control the receiver to detect at least one control channel on a plurality of component carriers and receive at least one data indicated by downlink control information that the at least one control channel carries, and control the transmitter to transmit the ACK/NACK information associated with the at least one data through SR PUCCH (Scheduling Request Physical Uplink Control Channel) resource. The downlink control information includes a number of control channels assigned to the user equipment, and the ACK/NACK information includes information on a number of ACK/NACKs corresponding to the at least one data within the plurality of component carriers.

Advantageous Effects

According to the present invention, control information can be efficiently transmitted in a wireless communication system. In addition, a channel format and a signal processing method can be provided for efficient transmission of control information. Resources for transmission of control information can be efficiently allocated.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 5 illustrates examples of mapping input symbols to subcarriers in the frequency domain in a manner that satisfies a single carrier property;

FIG. 17 illustrates ACK/NACK channelization for PUCCH Formats 1a and 1b;

FIG. 34 illustrates an ACK/NACK information transmission structure based on channel selection, to which the present invention is applied;

FIG. 34 illustrates an ACK/NACK information transmission structure based on enhanced channel selection, to which the present invention is applied; and FIG. 35 illustrates an operation for configuring a PUCCH format according to an embodiment of the present invention.

BEST MODE FOR CARRYING OUT THE INVENTION

Figure 1:
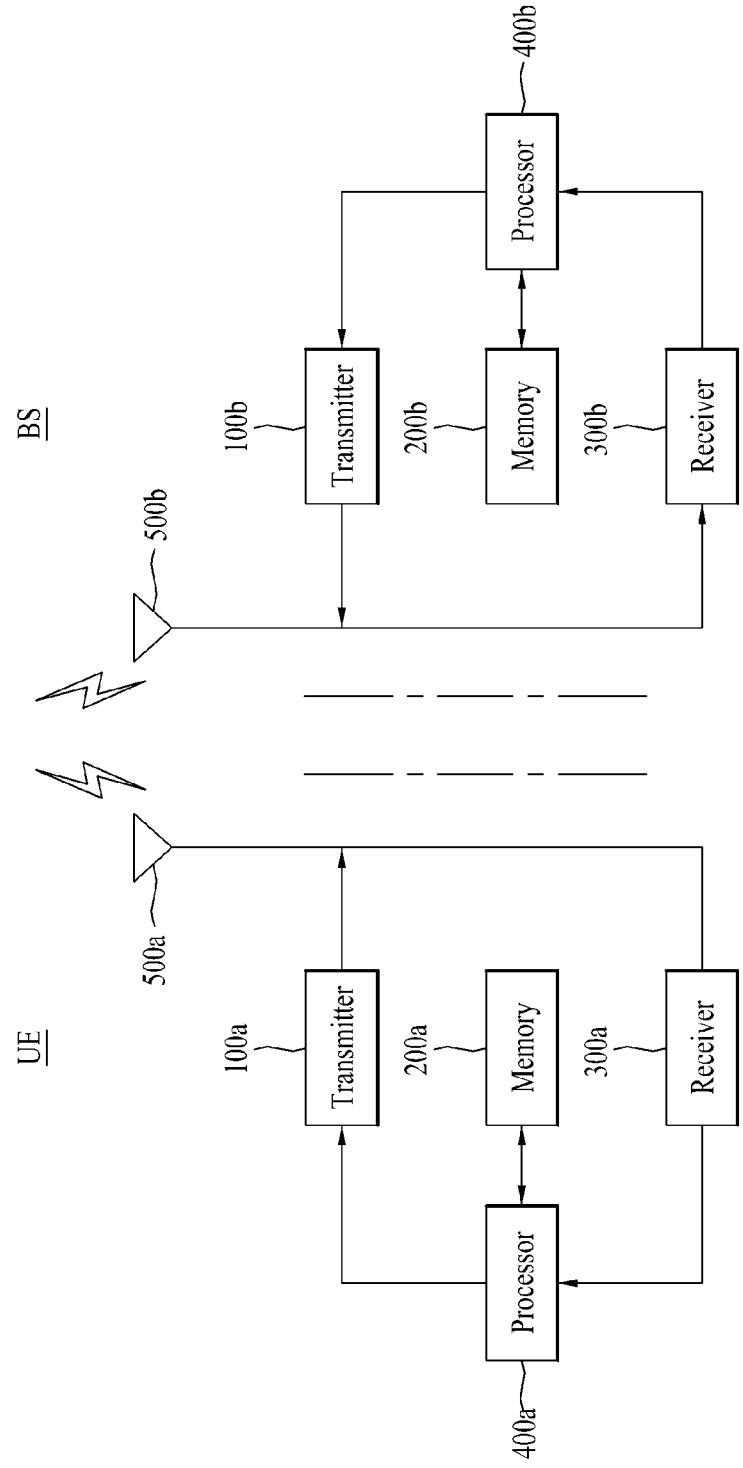
FIG. 1 is a block diagram of a User Equipment (UE) and a Base Station (BS), to which the present invention is applied.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Techniques, devices, and systems described herein can be used in various wireless multiple access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), Multi-Carrier Frequency Division Multiple Access (MC-FDMA), etc. CDMA may be implemented as a radio technology such as Universal Terrestrial Radio Access (UTRA) or CDMA2000. TDMA may be implemented as a radio technology such as Global System for Mobile communication (GSM), General Packet Radio Service (GPRS), and Enhanced Data Rates for GSM Evolution (EDGE). OFDMA may be implemented as a radio technology such as Institute of Electrical and Electronics Engineers (IEEE) 802.11 (Wi-Fi), IEEE 802.16 (WiMAX), IEEE 802.20, Evolved-UTRA (E-UTRA), etc. UTRAN is a part of Universal Mobile Telecommunication System (UMTS) and 3$^{rd}$ Generation Partnership Project (3GPP) Long Term Evolution (LTE) is a part of Evolved UMTS (E-UMTS) using E-UTRAN. 3GPP LTE employs OFDMA for downlink and SC-FDMA for uplink. LTE-A is an evolution of 3GPP LTE. For the convenience' sake of description, it is assumed that the present invention is applied to 3GPP LTE/LTE-A. However, the technical features of the present invention are not limited thereto. For example, while the following detailed description is given under the assumption that a 3GPP LTE/LTE-A wireless communication system is being used as a wireless communication system, the description is applicable to any other wireless communication system except for specific features inherent to the 3GPP LTE/LTE-A system.

In some instances, known structures and devices are omitted or are shown in block diagram form, focusing on important features of the structures and devices, so as not to obscure the concept of the invention. The same reference numbers will be used throughout this specification to refer to the same parts.

In the following description, a terminal generically refers to a mobile or fixed user terminal device for transmitting and receiving data and control information by communicating with a Base Station (BS). The term terminal may be replaced with User Equipment (UE), Mobile Station (MS), Mobile Terminal (MT), Subscriber Station (SS), wireless device, Personal Digital Assistant (PDA), wireless modem, handheld device, etc.

In addition, a BS generically refers to any fixed station which communicates with a UE or another BS, for exchanging data and control information with the UE or another BS. The term BS may be replaced with the term evolved Node B (eNB), Base Transceiver System (BTS), Access Point (AP), etc.

According to the present invention, allocation of a specific signal to a frame/subframe/slot/carrier/subcarrier means transmitting the specific signal on a corresponding carrier/subcarrier during the period of a corresponding frame/subframe/slot or at the timing of the corresponding frame/subframe/slot.

A rank or a transmission rank refers to the number of layers that are multiplexed or allocated to one Orthogonal Frequency Division Multiplexing (OFDM) symbol or one Resource Element (RE) in the present invention.

Physical Downlink Control CHannel (PDCCH), Physical Control Format Indicator CHannel (PCFICH), Physical Hybrid automatic retransmit request Indicator CHannel (PHICH), and Physical Downlink Shared CHannel (PDSCH) are sets of REs that respectively carry Downlink Control Information (DCI), a Control Format Indicator (CFI), a downlink ACKnowledgment/Negative ACKnowledgment (ACK/NACK), and downlink data in the present invention.

Physical Uplink Control CHannel (PUCCH), Physical Uplink Shared CHannel (PUSCH), and Physical Random Access CHannel (PRACH) are sets of REs that respectively carry Uplink Control Information (UCI), uplink data, and a random access signal.

Especially, REs allocated to or belonging to the PDCCH, PCFICH, PHICH, PDSCH, PUCCH, PUSCH, and PRACH are referred to as PDCCH, PCFICH, PHICH, PDSCH, PUCCH, PUSCH, and PRACH REs or resources.

Accordingly, if it is said that a UE transmits a PUCCH, PUSCH, or PRACH, this may mean that the UE transmits UCI, uplink data, or a random access signal on the PUCCH, PUSCH, or PRACH. In addition, if it is said that a BS transmits a PDCCH, PCFICH, PHICH, or PDSCH, this may mean that the BS transmits DCI or downlink data on the PDCCH, PCFICH, PHICH, or PDSCH.

Mapping ACK/NACK information to a specific constellation point is equivalent to mapping ACK/NACK information to a specific complex-valued modulation symbol. Mapping ACK/NACK information to a specific complex-valued modulation symbol is also equivalent to modulating ACK/NACK information to a specific complex-valued modulation symbol.

FIG. 1 is a block diagram of a UE and a BS, to which the present invention is applied. The UE operates as a transmission side on uplink and as a reception side on downlink. On the contrary, the BS operates as a reception side on uplink and as a transmission side on downlink.

Referring to FIG. 1, the UE and the BS include antennas 500a and 500b for receiving information, data, signals, or messages, transmitters 100a and 100b for transmitting information, data, signals, or messages by controlling the antennas 500a and 500b, receivers 300a and 300b for receiving information, data, signals, or messages by controlling the antennas 500a and 500b, and memories 200a and 200b for temporarily or permanently storing various types of information in the wireless communication system. The UE and the BS further include processors 400a and 400b connected to the transmitters, 100a and 100b, the receivers 300a and 300b, and the memories 200a and 200b in terms of operation, for controlling each component.

The transmitter 100a, the receiver 300a, the memory 200a, and the processor 400a of the UE may be configured as independent components on respective chips or two or more of them may be integrated into one chip. The transmitter 100b, the receiver 300b, the memory 200b, and the processor 400b of the BS may be configured as independent components on respective chips or two or more of them may be integrated into one chip. The transmitter and the receiver may be integrated into a single transceiver in the UE or the BS.

The antennas 500a and 500b transmit signals generated from the transmitters 100a and 100b to the outside or receive signals from the outside and provide the received signals to the receivers 300a and 300b. The antennas 500a and 500b are also referred to as antenna ports. An antenna port may correspond to one physical antenna or a combination of a plurality of physical antennas. If a transmitter and a receiver support Multiple Input Multiple Output (MIMO) in which data is transmitted and received through a plurality of antennas, each of them may be connected to two or more antennas.

The processor 400a or 400b generally provides overall control to the components or modules of the UE or the BS. Especially, the processors 400a and 400b may perform various control functions for implementing the present invention, a Medium Access Control (MAC) frame conversion control function based on service characteristics and a propagation environment, a power saving mode function for controlling an idle-mode operation, a handover function, an authentication and encryption function, etc. The processors 400a and 400b may be called controllers, microcontrollers, microprocessors, or microcomputers. Meanwhile, the processors 400a and 400b may be configured in hardware, firmware, software, or a combination of them.

In a hardware configuration, the processors 400a and 400b may include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. which are configured to implement the present invention.

In a firmware or software configuration, firmware or software may be configured so as to include a module, a procedure, a function, etc. that perform the functions or operations of the present invention. The firmware or software configured to implement the present invention may be included in the processors 400a and 400b, or may be stored in the memories 200a and 200b and executed by the processors 400a and 400b.

The transmitters 100a and 100b encode and modulate signals or data which are scheduled by the processors 400a and 400b or schedulers connected to the processors 400a and 400b and transmitted to the outside, in a predetermined coding and modulation scheme, and transmit the modulated signals or data to the antennas 500a and 500b. The transmitters 100a and 100b and the receivers 300a and 300b of the UE and the BS may be configured differently according to operations of processing a transmission signal and a received signal.

The memories 200a and 200b may store programs for processing and controlling in the processors 400a and 400b and may temporarily store input and output information. The memories 200a and 200b may be used as buffers. The memories 200a and 200b may be configured using a flash memory type, a hard disk type, a multimedia card micro type, a card type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, etc.

Figure 2:
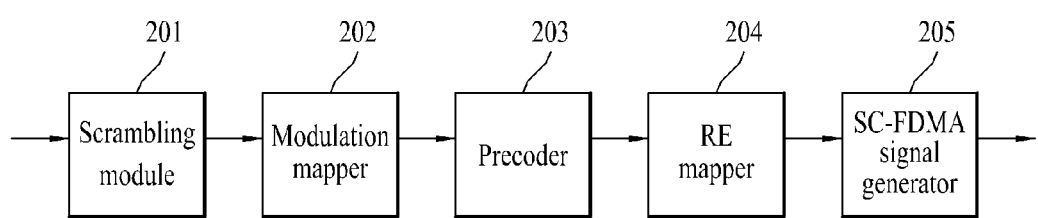
FIG. 2 illustrates a signal processing operation for transmitting an uplink signal at a UE.

FIG. 2 illustrates a signal processing operation for transmitting an uplink signal at a UE. Referring to FIG. 2, the transmitter 100a of the UE may include a scrambling module 201, a modulation mapper 202, a precoder 203, an RE mapper 204, and an SC-FDMA signal generator 205.

The scrambling module 201 may scramble a transmission signal with a scrambling signal in order to transmit an uplink signal. The modulation mapper 202 modulates the scrambled signal received from the scrambling module 201 to complex-valued modulation symbols in Binary Phase Shift Keying (BPSK), Quadrature Phase Shift Keying (QPSK), or 16-ary Quadrature Amplitude Modulation (16QAM)/64-ary QAM (64QAM) according to the type of the transmission signal or a channel state. The precoder 203 processes the complex-valued modulation symbols received from the modulation mapper 202. The RE mapper 204 may map the complex-valued modulation symbols received from the precoder 203 to time-frequency REs. After being processed in the SC-FDMA signal generator 205, the mapped signal may be transmitted to a BS through an antenna port.

Figure 3:
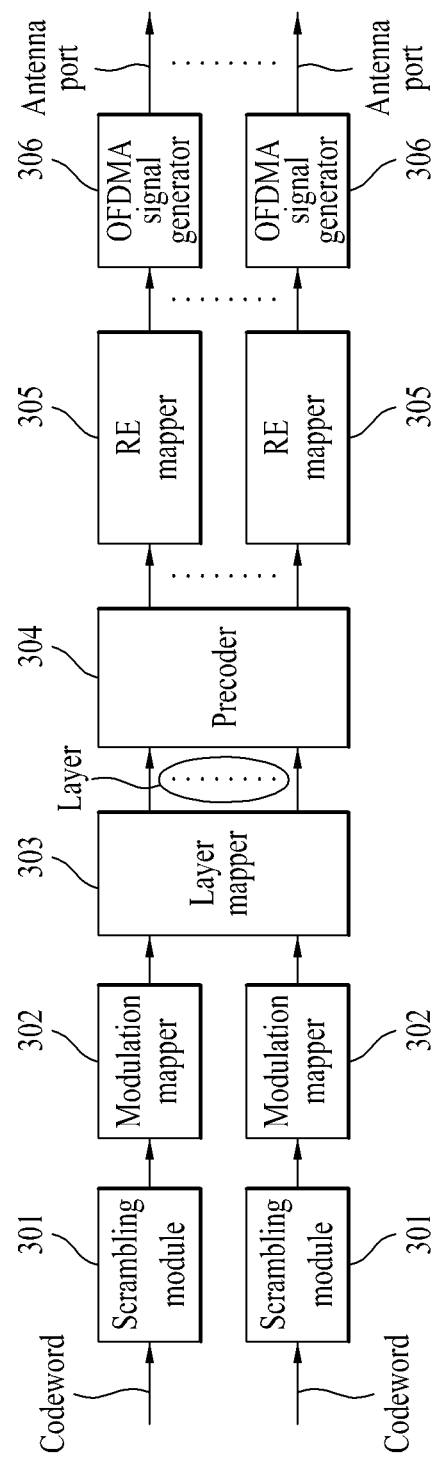
FIG. 3 illustrates a signal processing operation for transmitting a downlink signal at a BS.

FIG. 3 illustrates a signal processing operation for transmitting a downlink signal at a BS. Referring to FIG. 3, the transmitter 100b of the BS may include scrambling modules 301, modulation mappers 302, a layer mapper 303, a precoder 304, RE mappers 305, and OFDMA signal generators 306.

To transmit a signal or one or more codewords on downlink, the scrambling modules 301 and the modulation mappers 302 may modulate the signal or the one or more codewords to complex-valued modulation symbols, as is done on uplink in the signal processing operation illustrated in FIG. 2. The layer mapper 303 maps the complex-valued modulation symbols to a plurality of layers. The precoder 304 may multiply the layers by a precoding matrix and may allocate the multiplied signals to respective transmission antennas. The RE mappers 305 map the antenna-specific signals received from the precoder 304 to time-frequency REs. After being processed in the OFDMA signal generators 306, the mapped signals may be transmitted through respective antenna ports.

In the wireless communication system, Peak-to-Average Power Ratio (PAPR) becomes a challenging issue to uplink signal transmission from a UE, relative to downlink signal transmission from a BS. Accordingly, SC-FDMA is adopted for uplink signal transmission, while OFDMA is used for downlink signal transmission, as described before with reference to FIGS. 2 and 3.

Figure 4:
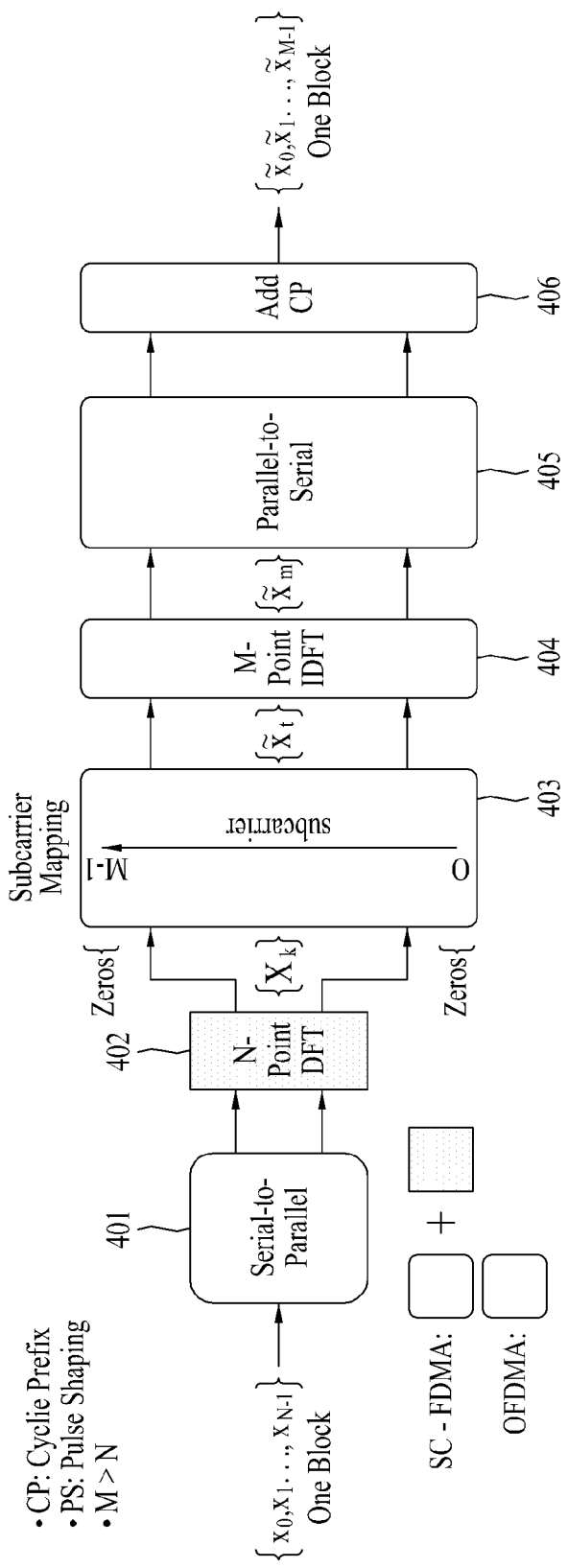
FIG. 4 illustrates Single Carrier Frequency Division Multiple Access (SC-FDMA) and Orthogonal Frequency Division Multiple Access (OFDMA), to which the present invention is applied.

FIG. 4 illustrates SC-FDMA and OFDMA, to which the present invention is applied. The 3GPP system employs OFDMA for downlink and SC-FDMA for uplink.

Referring to FIG. 4, both a UE and a BS commonly have a Serial-to-Parallel Converter (SPC) 401, a subcarrier mapper 403, an M-point Inverse Discrete Fourier Transform (IDFT) module 404, and a Cyclic Prefix (CP) adder 406, for uplink signal transmission and downlink signal transmission. Notably, the UE further includes an N-point Discrete Fourier Transform (DFT) module 402 to transmit an uplink signal in SC-FDMA. The N-point DFT module 402 partially compensates for the effects of IDFT performed by the M-point IDFT module 404 so that a transmission uplink signal may assume a single carrier property.

SC-FDMA should satisfy the single carrier property. FIG. 5 illustrates examples of mapping input symbols to subcarriers in the frequency domain in a manner that satisfies the single carrier property. A transmission signal satisfying the single carrier property can be achieved by allocating DFT symbols to subcarriers according to one of the schemes illustrated in FIGS. 5(a) and 5(b). Specifically, FIG. 5(a) illustrates localized mapping and FIG. 5(b) illustrates distributed mapping.

Figure 6:
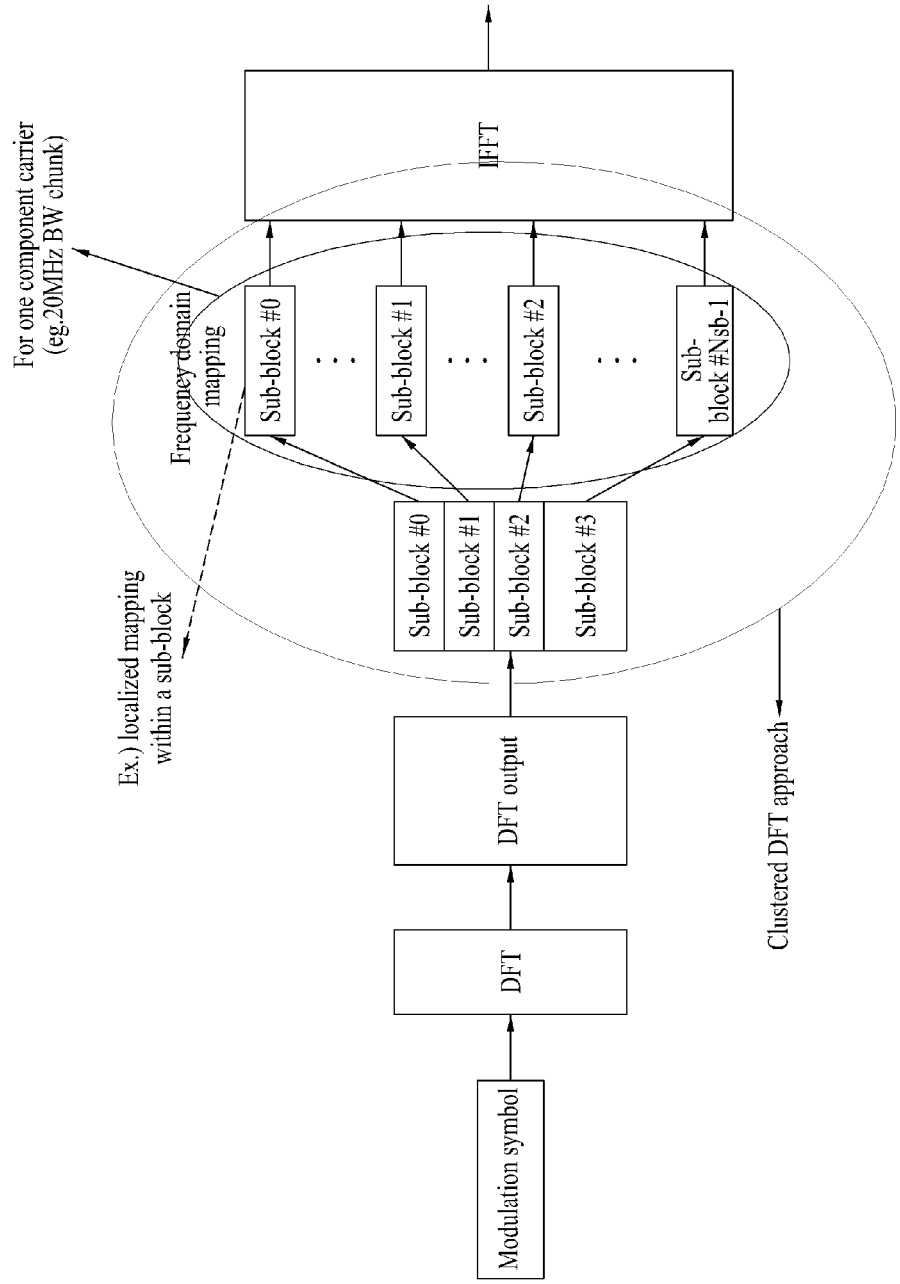
FIG. 6 illustrates a signal processing operation for mapping Discrete Fourier Transform (DFT) output samples to a single carrier in clustered SC-FDMA.
Figure 7:
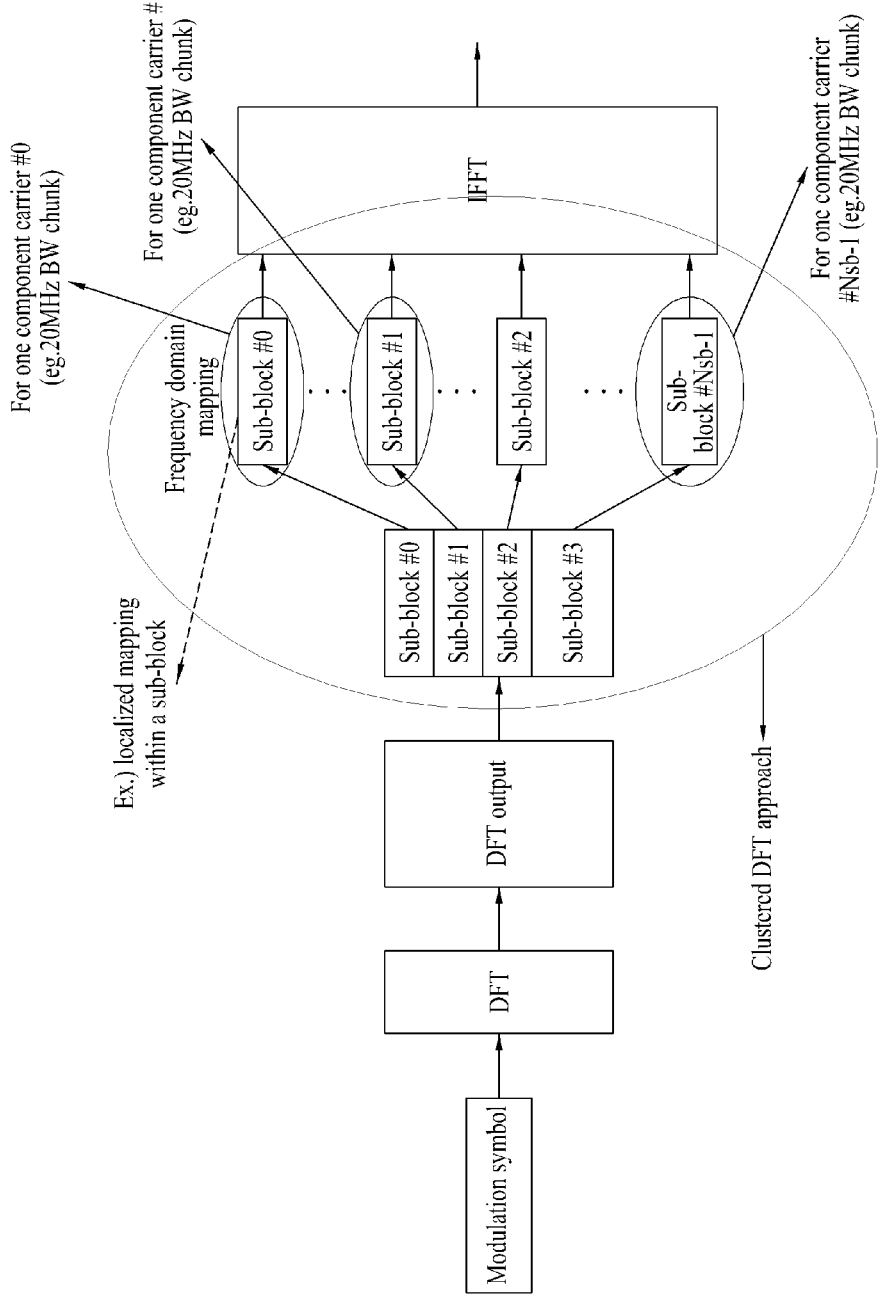
FIGS. 7 and 8 illustrate signal processing operations for mapping DFT output samples to multiple carriers in clustered SC-FDMA.
Figure 8:
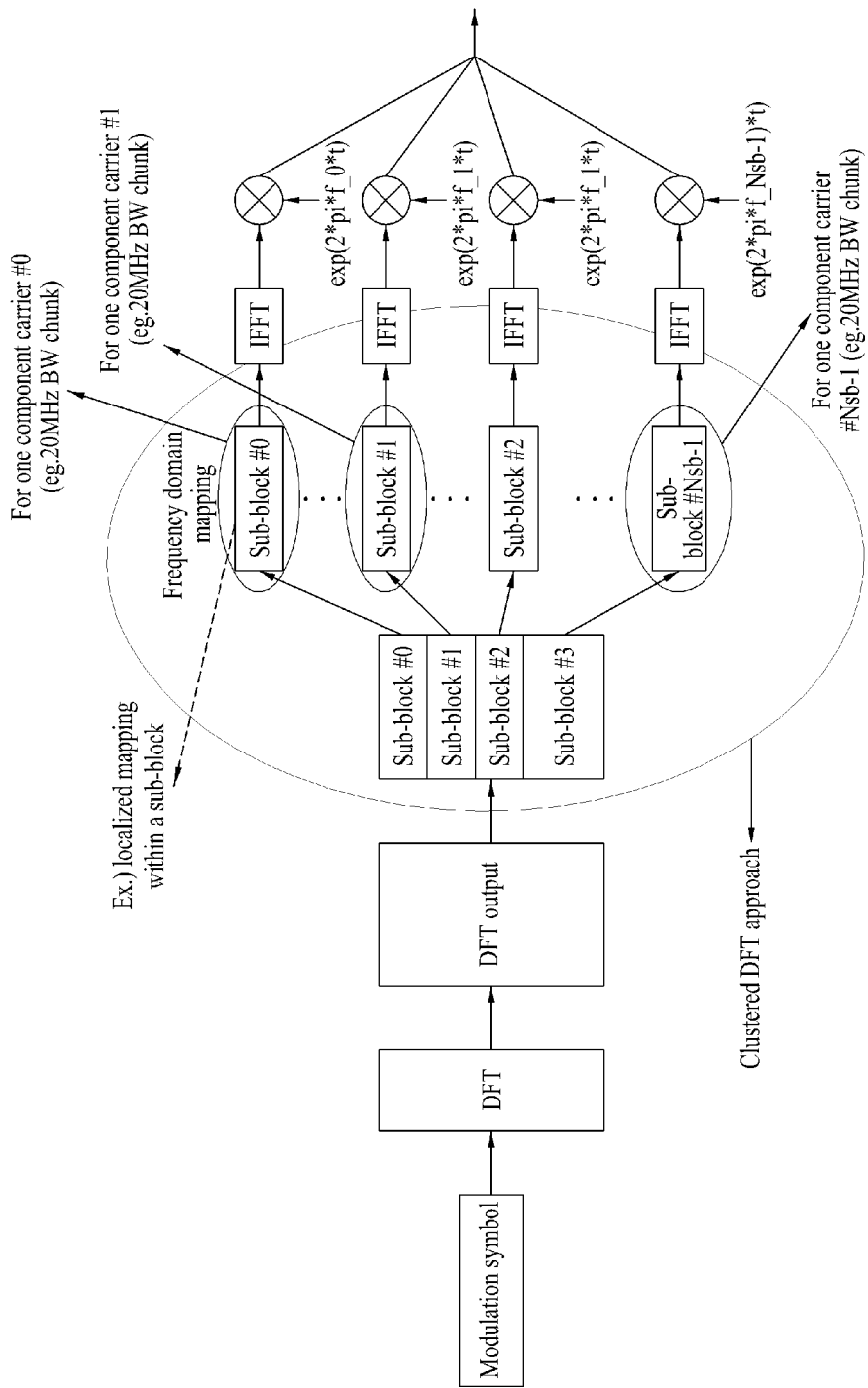

Meanwhile, the transmitters 100a and 100b may adopt clustered DFT spread OFDM (DFT-s-OFDM). Clustered DFT-s-OFDM is a modification of conventional SC-FDMA, in which a precoded signal is divided into a predetermined number of sub-groups and mapped to non-contiguous subcarriers. FIGS. 6, 7 and 8 illustrate examples of mapping input symbols to a single carrier in clustered DFT-s-OFDM.

FIG. 6 illustrates an operation for mapping DFT output samples to a single carrier in clustered SC-FDMA. FIGS. 7 and 8 illustrate operations for mapping DFT output samples to multiple carriers in clustered SC-FDMA. FIG. 6 illustrates an example of applying intra-carrier clustered SC-FDMA, whereas FIGS. 7 and 8 illustrate examples of applying inter-carrier clustered SC-FDMA. More specifically, in a state where contiguous Component Carriers (CCs) are allocated in the frequency domain, with their subcarriers aligned with a subcarrier spacing, a signal is generated in a single IFFT block in the illustrated case of FIG. 7. With non-contiguous CCs allocated in the frequency domain, a signal is generated in a plurality of IFFT blocks in the illustrated case of FIG. 8.

Figure 9:
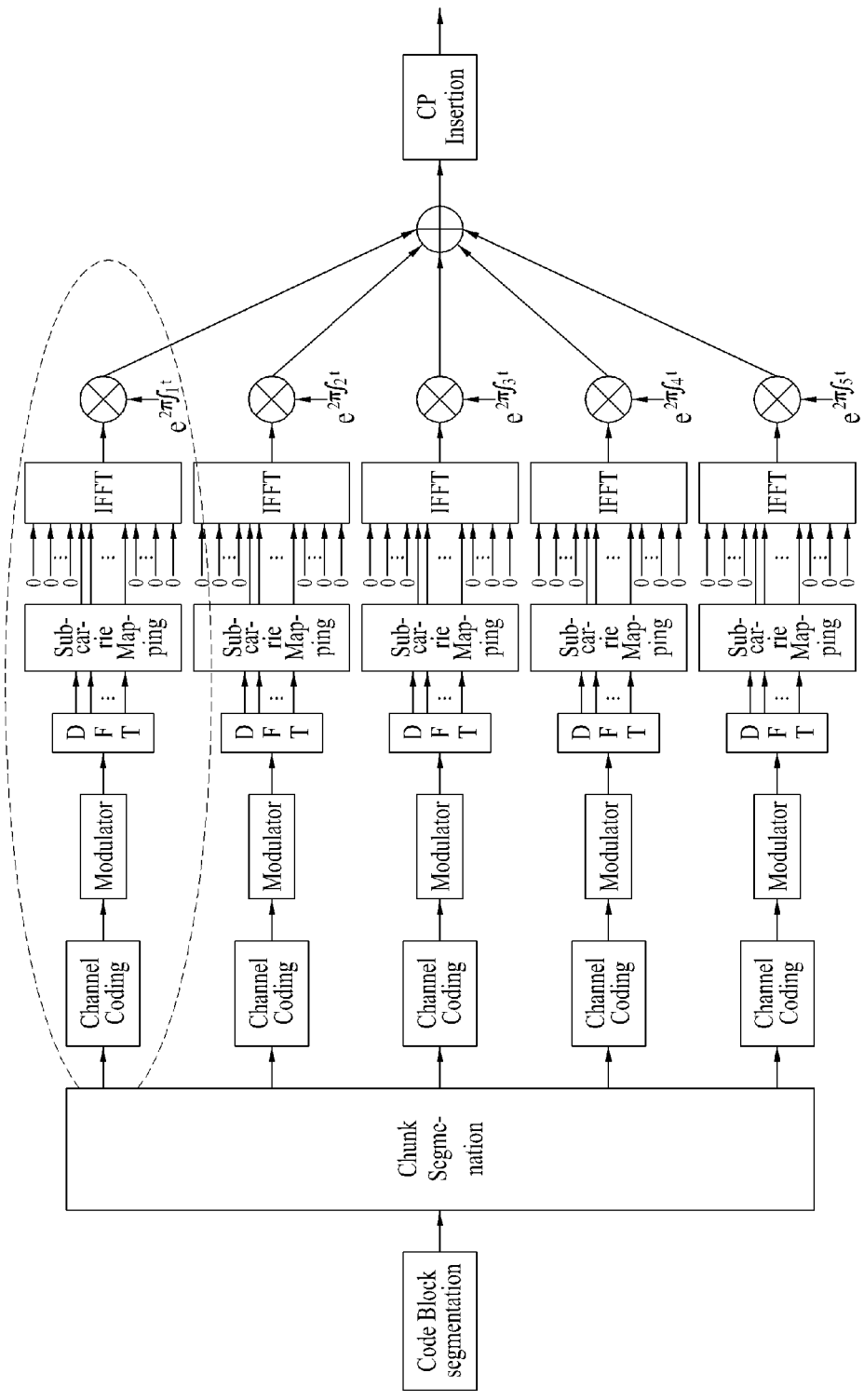
FIG. 9 illustrates a signal processing operation in segmented SC-FDMA.

FIG. 9 illustrates a signal processing operation in segmented SC-FDMA.

As the number of DFT blocks is equal to the number of IFFT blocks and thus the DFT blocks and the IFFT blocks are in a one-to-one correspondence, segmented SC-FDMA is a simple extension of the DFT spreading and IFFT subcarrier mapping structure of the conventional SC-FDMA. Segmented SC-FDMA may also be called NxSC-FDMA or NxDFT-s-OFDMA. Herein, segmented SC-FDMA covers all these terms. Referring to FIG. 9, segmented SC-FDMA is characterized in that total time-domain modulation symbols are divided into N groups (N is an integer larger than 1) and a DFT process is performed on a group-by-group basis in order to relieve the single carrier property constraint.

Figure 10:
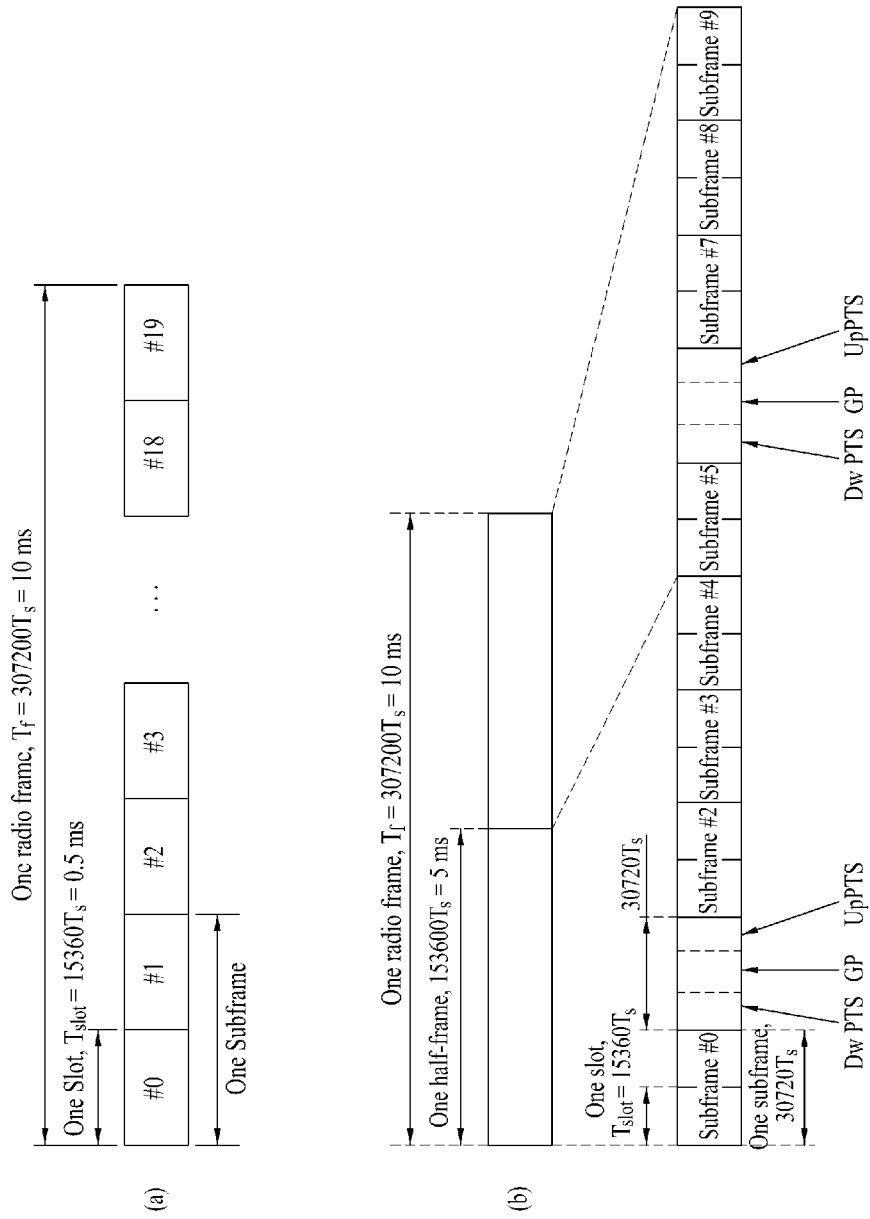
FIG. 10 illustrates exemplary radio frame structures in a wireless communication system.

FIG. 10 illustrates exemplary radio frame structures used in a wireless communication system. Specifically, FIG. 10(a) illustrates a radio frame of Frame Structure 1 (FS-1) in the 3GPP LTE/LTE-A system and FIG. 10(b) illustrates a radio frame of Frame Structure 2 (FS-2) in the 3GPP LTE/LTE-A system. The frame structure of FIG. 10(a) may apply to Frequency Division Duplex (FDD) mode and half-FDD (H-FDD) mode, while the frame structure of FIG. 10(b) may apply to Time Division Duplex (TDD) mode.

Referring to FIG. 10, a radio frame is 10 ms ($307200T_s$) long in 3GPP LTE/LTE-A, including 10 equally sized subframes. The 10 subframes of the radio frame may be numbered. Herein, $T_s$ is a sampling time, expressed as $T_s=1/(2048 \times 15 \text{ kHz})$. Each subframe is 1 ms long, including two slots. The 20 slots of the radio frame may be sequentially numbered from 0 to 19. Each slot has a length of 0.5 ms. A time required to transmit one subframe is defined as a Transmission Time Interval (TTI). Time resources may be identified by a radio frame number (or a radio frame index), a subframe number (or a subframe index), and a slot number (or a slot index).

Different radio frames may be configured for different duplex modes. For example, downlink transmission is distinguished from uplink transmission by frequency in the FDD mode. Therefore, an FDD frame includes only downlink subframes or only uplink subframes.

On the other hand, since downlink transmission is distinguished from uplink transmission by time in the TDD mode, the subframes of a radio frame are divided into downlink subframes and uplink subframes.

Figure 11:
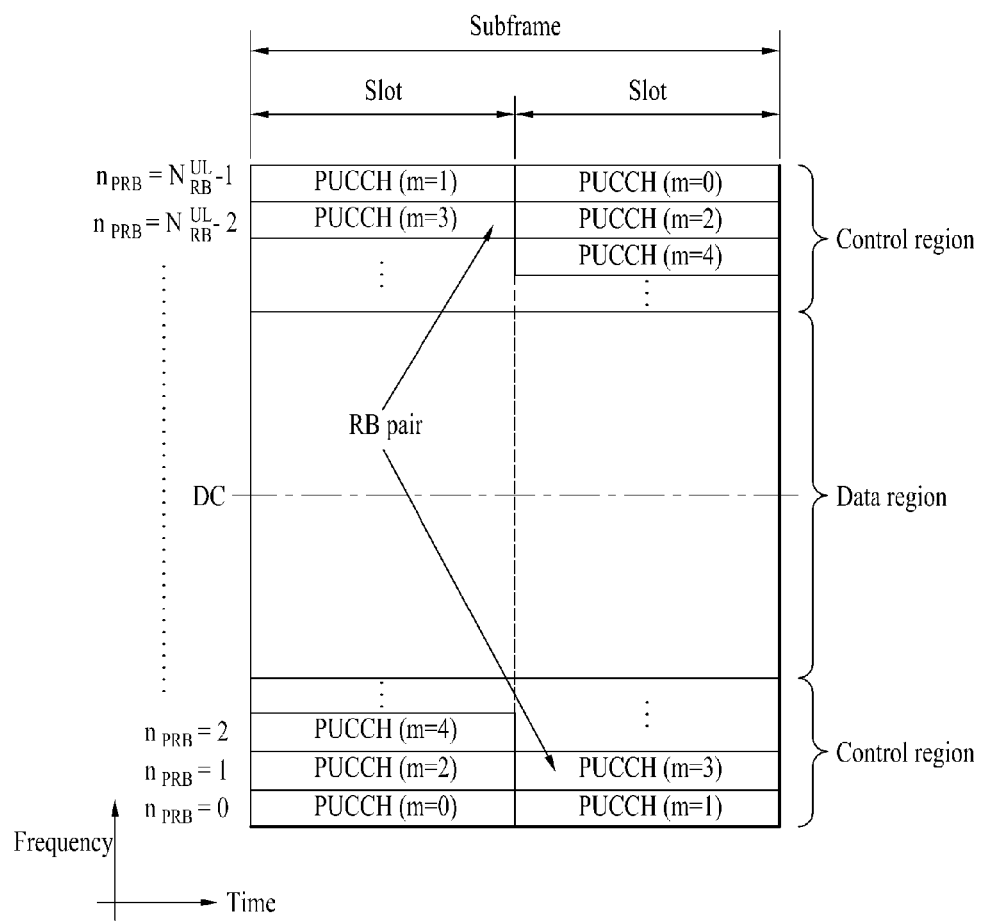
FIG. 11 illustrates an uplink subframe structure.

FIG. 11 illustrates an uplink subframe structure to which the present invention is applied. Referring to FIG. 11, an uplink subframe may be divided into a control region and a data region in the frequency domain. At least one PUCCH may be allocated to the control region to transmit UCI. In addition, at least one PUSCH may be allocated to the data region to transmit user data. If a UE adopts SC-FDMA, it cannot transmit a PUCCH and a PUSCH simultaneously in order to maintain the single carrier property.

UCI transmitted on a PUCCH differs in size and usage depending on PUCCH formats. The size of UCI may also vary according to a coding rate. For example, the following PUCCH formats may be defined.

(1) PUCCH Format 1: used for On-Off keying (OOK) modulation and a Scheduling Request (SR).

(2) PUCCH Formats 1a and 1b: used for transmitting ACK/NACK information.

1) PUCCH Format 1a: ACK/NACK information modulated in BPSK for one codeword.

1) PUCCH Format 1b: ACK/NACK information modulated in QPSK for two codewords.

(3) PUCCH Format 2: modulated in QPSK and used for Channel Quality Indicator (CQI) transmission.

(4) PUCCH Formats 2a and 2b: used for simultaneous transmission of a CQI and ACK/NACK information.

Table 1 lists modulation schemes and numbers of bits per subframe for PUCCH formats and Table 2 lists numbers of Reference Signals (RSs) per slot for PUCCH formats. Table 3 lists SC-FDMA symbol positions of RSs for PUCCH formats. In Table 1, PUCCH Formats 2a and 2b are for the case of a normal CP.

TABLE 1

| PUCCH Format | Modulation | Number of Bits per Subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 2

| PUCCH Format | Normal CP | Extended CP |
|---|---|---|
| 1, 1a, 1b | 3 | 2 |
| 2 | 2 | 1 |
| 2a, 2b | 2 | N/A |

| | SC-FDMA Symbol Position of RS | |
|---|---|---|
| PUCCH Format | Normal CP | Extended CP |
| 1, 1a, 1b | 2, 3, 4 | 2, 3 |
| 2, 2a, 2b | 1, 5 | 3 |

Subcarriers far from a Direct Current (DC) subcarrier are used for the control region in the uplink subframe. In other words, subcarriers at both ends of an uplink transmission bandwidth are allocated for transmission of UCI. The DC subcarrier is a component that is spared from signal transmission and mapped to carrier frequency $f_0$ during frequency upconversion in an OFDMA/SC-FDMA signal generator.

A PUCCH from one UE is allocated to an RB pair in a subframe and the RBs of the RB pair occupy different subcarriers in two slots. This PUCCH allocation is called frequency hopping of an RB pair allocated to a PUCCH over a slot boundary. However, if frequency hopping is not applied, the RB pair occupies the same subcarriers in two slots. Since a PUCCH from a UE is allocated to an RB pair in a subframe irrespective of frequency hopping, the same PUCCH is transmitted twice, each time in one RB of each slot in the subframe.

Hereinafter, an RB pair used for transmission of a PUCCH in a subframe is referred to as a PUCCH region or a PUCCH resource. For the convenience' sake of description, a PUCCH carrying ACK/NACK information is referred to as an ACK/NACK PUCCH, a PUCCH carrying Channel Quality Indicator/Precoding Matrix Index/Rank Indicator (CQI/PMI/RI) information is referred to as a Channel State Information (CSI) PUCCH, and a PUCCH carrying SR information is referred to as an SR PUCCH.

A BS allocates PUCCH resources to a UE explicitly or implicitly, for transmission of UCI.

UCI such as ACK/NACK information, CQI information, PMI information, RI information, and SR information may be transmitted in the control region of an uplink subframe.

The UE and the BS transmit and receive signals or data from or to each other in the wireless communication system. When the BS transmits data to the UE, the UE decodes the received data. If the data decoding is successful, the UE transmits an ACK to the BS. On the contrary, if the data decoding is failed, the UE transmits a NACK to the BS. The same thing applies to the opposite case, that is, the case where the DE transmits data to the BS. In the 3GPP LTE system, the UE receives a PDSCH from the BS and transmits an ACK/NACK for the received PDSCH on a PUCCH that is implicitly determined by a PDCCH carrying scheduling information for the PDSCH.

Figure 12:
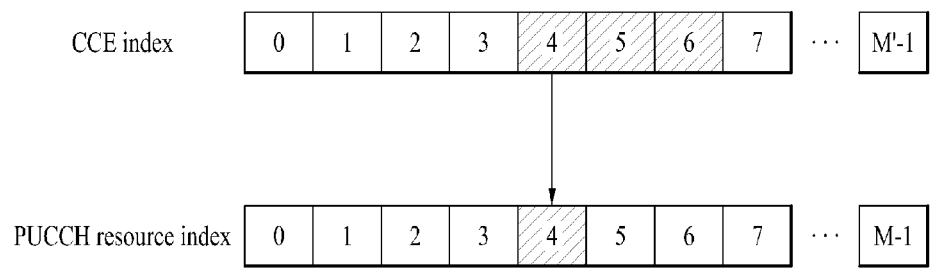
FIG. 12 illustrates a structure for determining a Physical Uplink Control CHannel (PUCCH) for ACKnowledgment/Negative ACKnowledgment (ACK/NACK) transmission.

FIG. 12 illustrates a structure for determining a PUCCH for ACK/NACK transmission, to which the present invention is applied.

A PUCCH that will carry ACK/NACK information is not allocated in advance to a UE. Rather, a plurality of PUCCHs are used separately at each time instant by a plurality of UEs within a cell. Specifically, a PUCCH that a UE will use to transmit ACK/NACK information is implicitly indicated by a PDCCH carrying scheduling information for a PDSCH that delivers downlink data. An entire area carrying PDCCHs in a downlink subframe include a plurality of Control Channel Elements (CCEs) and a PDCCH transmitted to a UE includes one or more CCEs. A CCE includes a plurality of (e.g. 9) Resource Element Groups (REGs). One REG includes four contiguous REs except for an RS. The UE transmits ACK/NACK information on an implicit PUCCH that is derived or calculated by a function of a specific CCE index (e.g. the first or lowest CCE index) from among the indexes of CCEs included in a received PDCCH.

Referring to FIG. 12, PUCCH resource indexes indicate PUCCHs for transmitting an ACK/NACK. As illustrated in FIG. 12, on the assumption that a PDCCH including CCEs #4, #5 and #6 delivers scheduling information for a PDSCH to a UE, the UE transmits an ACK/NACK to a BS on a PUCCH, for example, PUCCH #4 derived or calculated using the lowest CCE index of the PDCCH, CCE index 4.

In the illustrated case of FIG. 12, there are up to M' CCEs in a downlink subframe and up to M PUCCHs in an uplink subframe. Although M may be equal to M', M may be different from M' and CCEs may be mapped to PUCCHs in an overlapping manner. For instance, a PUCCH resource index may be calculated by the following equation.

$$n^{(1)}_{PUCCH} = n_{CCE} + N^{(1)}_{PUCCH}$$

$n^{(1)}_{PUCCH}$ denotes the index of a PUCCH resource for transmitting ACK/NACK information, $N^{(1)}_{PUCCH}$ denotes a signal value received from a higher layer, and $n_{CCE}$ denotes the lowest of CCE indexes used for transmission of a PDCCH.

Figure 13:
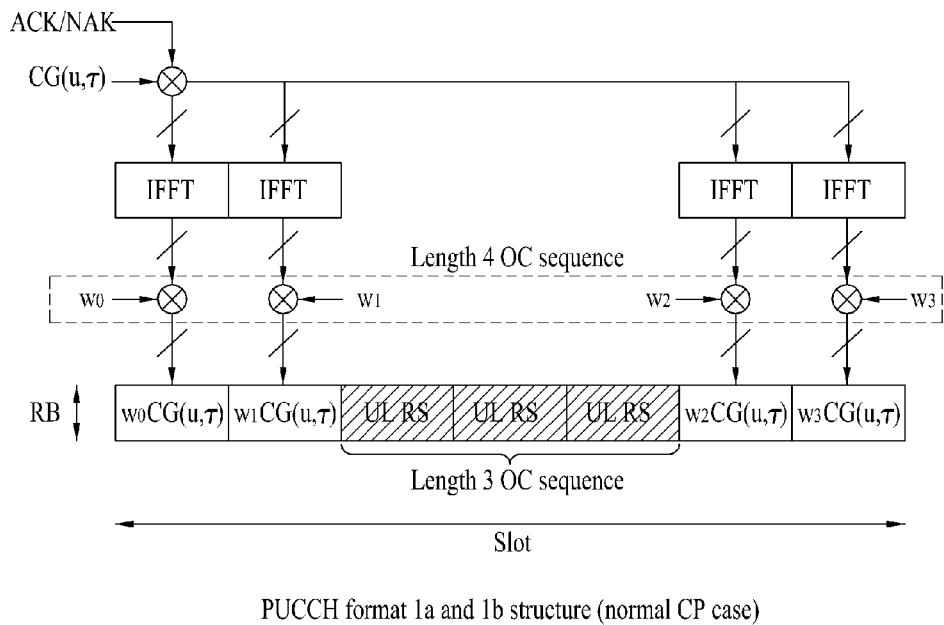
FIGS. 13 and 14 illustrate slot-level structures of PUCCH Formats 1a and 1b for ACK/NACK transmission.
Figure 14:
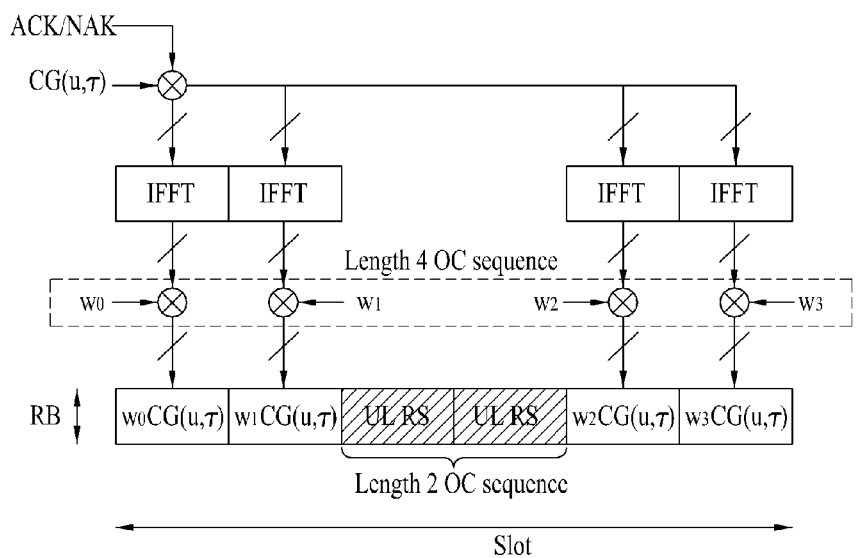

FIGS. 13 and 14 illustrate slot-level structures of PUCCH Formats 1a and 1b for ACK/NACK transmission.

FIG. 13 illustrates PUCCH Formats 1a and 1b in case of a normal CP and FIG. 14 illustrates PUCCH Formats 1a and 1b in case of an extended CP. The same UCI is repeated on a slot basis in a subframe in PUCCH Format 1a and 1b. A UE transmits an ACK/NACK signal in the resources of a different Cyclic Shift (CS) (a frequency-domain code) of a Computer-Generated Constant Amplitude Zero Auto Correlation (CG-CAZAC) sequence and an Orthogonal Cover (OC) or Orthogonal Cover Code (OCC) (a time-domain spreading code). The OC includes, for example, a Walsh/DFT orthogonal code. Given six CSs and three OCs, a total of 18 UEs may be multiplexed into the same PRB, for a single antenna. An OC sequence w0, w1, w2 and w3 is applicable to a time domain (after FFT modulation) or to a frequency domain (before FFT modulation). PUCCH Format 1 for transmitting SR information is the same as PUCCH Formats 1a and 1b in terms of slot-level structure and different from PUCCH Formats 1a and 1b in terms of modulation.

PUCCH resources composed of a CS, an OC, and a PRB may be allocated to a UE by Radio Resource Control (RRC) signaling, for transmission of SR information and an ACK/NACK for Semi-Persistent Scheduling (SPS). As described before with reference to FIG. 12, PUCCH resources may be indicated to a UE implicitly using the lowest CCE index of a PDCCH corresponding to a PDSCH or the lowest CCE index of a PDCCH for SPS release, for a dynamic ACK/NACK (or an ACK/NACK for non-persistent scheduling) feedback or an ACK/NACK feedback for a PDCCH indicating SPS release.

Figure 15:
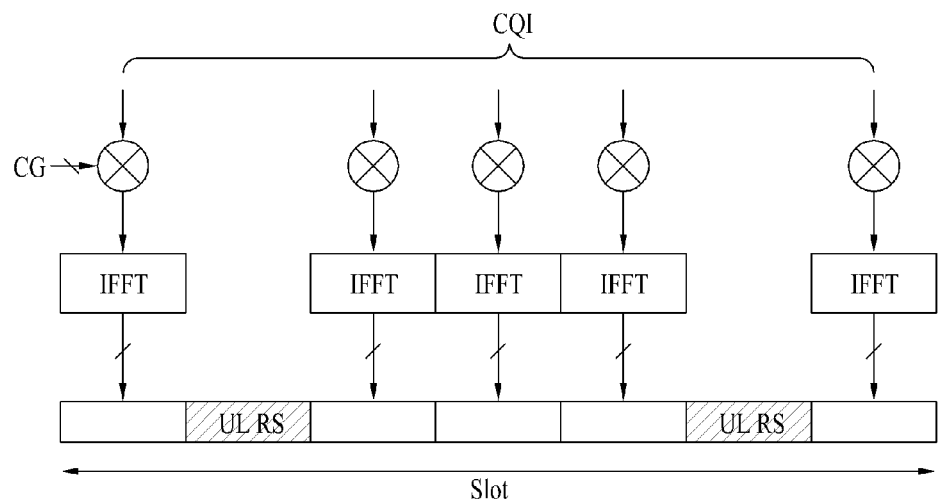
FIG. 15 illustrates PUCCH Format 2/2a/2b in case of a normal Cyclic Prefix (CP)
Figure 16:
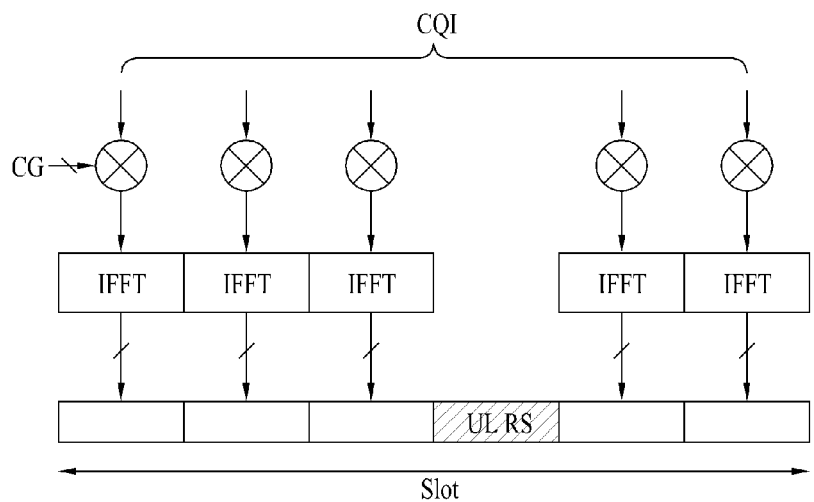
FIG. 16 illustrates PUCCH Format 2/2a/2b in case of an extended CP.

FIG. 15 illustrates PUCCH Format 2/2a/2b in case of a normal CP and FIG. 16 illustrates PUCCH Format 2/2a/2b in case of an extended CP. Referring to FIGS. 15 and 16, one subframe includes 10 QPSK symbols except for an RS symbol in case of a normal CP. Each QPSK symbol is spread with a CS in the frequency domain and then mapped to a corresponding SC-FDMA symbol. SC-FDMA symbol-level CS hopping may be used to randomize inter-cell interference. An RS may be multiplexed in Code Division Multiplexing (CDM) using a CS. For example, if there are 12 or 6 available CSs, 12 or 6 UEs may be multiplexed in the same PRB. That is, a plurality of UEs may be multiplexed using CS+OC+PRB and CS+PRB in PUCCH Formats 1/1a/1b and 2/2a/2b.

OCs of length 4 or length 3 for PUCCH Format 1/1a/1b are illustrated in Table 4 and Table 5 below.

TABLE 4

| Sequence Index | OC |
|---|---|
| 0 | [+1 +1 +1 +1] |
| 1 | [+1 −1 +1 −1] |
| 2 | [+1 −1 −1 +1] |

TABLE 5

| Sequence Index | OC |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

OCs for RSs in PUCCH Format 1/1a/1b are given in Table 6 below.

TABLE 6

| Sequence Index | Normal CP | Extended CP |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

FIG. 17 illustrates ACK/NACK channelization for PUCCH Formats 1a and 1b. In FIG. 14, $\Delta_{shift}^{PUCCH} = 2$.

Figure 18:
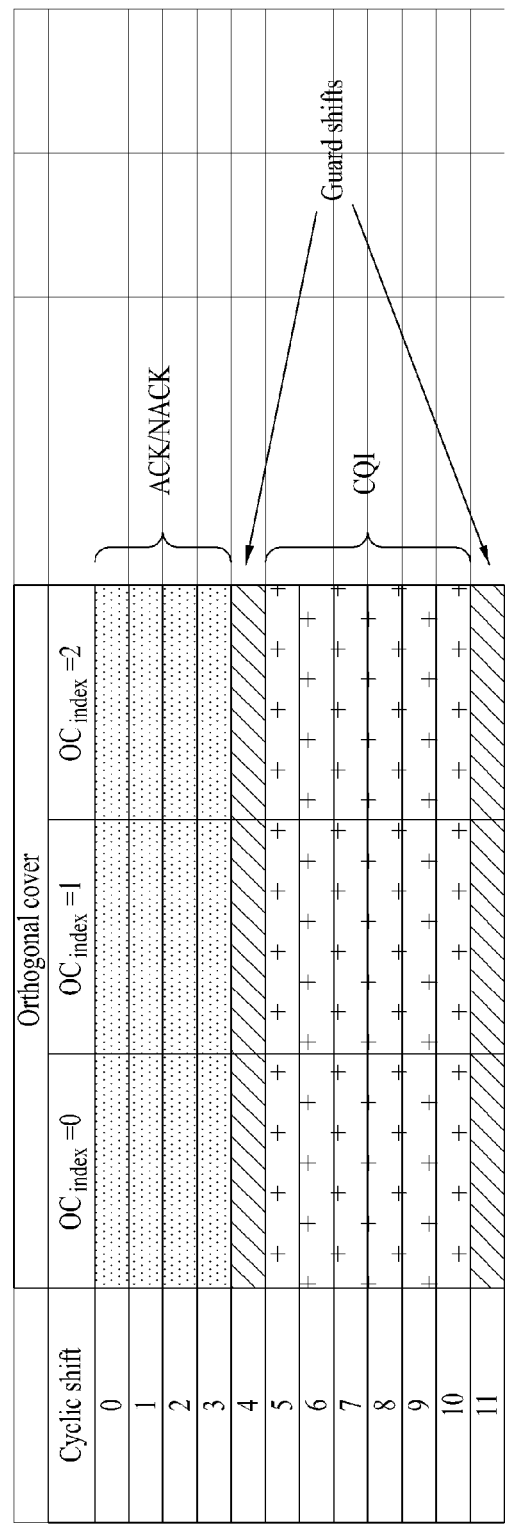
FIG. 18 illustrates channelization for a hybrid structure of PUCCH Format 1/1a/1b and PUCCH Format 2/2a/2b in the same Physical Resource Block (PRB)

FIG. 18 illustrates channelization for a hybrid structure of PUCCH Format 1/1a/1b and PUCCH Format 2/2a/2b in the same PRB.

CS hopping and OC re-mapping may be performed as follows.

(1) Symbol-based cell-specific CS hopping to randomize inter-cell interference (2) Slot-level CS/OS re-mapping
  1) for randomization of inter-cell interference
  2) slot-based approach for mapping between ACK/NACK channels and resources k Meanwhile, resources ($n_r$) for PUCCH Format 1/1a/1b include the following combinations.

(1) CS (identical to DFT OC at symbol level) ($n_{cs}$)
(2) OC (OC at slot level) ($n_{oc}$)
(3) Frequency RB ($n_{rb}$)

Let the indexes of a CS, an OC, and an RB be denoted by $n_{cs}$, $n_{oc}$, and $n_{rb}$, respectively. Then, a representative index $n_r$ includes $n_{cs}$, $n_{og}$, and $n_{rb}$. $n_r$ satisfies $n_r = (n_{cs}, n_{oc}, n_{rb})$.

A combination of an ACK/NACK and a CQI, PMI and RI, and a combination of an ACK/NACK and a CQI may be delivered in PUCCH Format 2/2a/2b. Reed Muller (RM) channel coding may be applied.

For example, channel coding for an uplink CQI is described as follows in the LTE system. A bit stream $a_0, a_1, a_2, a_3, \ldots, a_{A-1}$ is channel-encoded with a (20, A) RM code. Table 7 lists base sequences for the (20, A) code. $a_0$ and $a_{A-1}$ are the Most Significant Bit (MS) and Least Significant Bit (LSB), respectively. Aside from simultaneous transmission of a CQI and an ACK/NACK, up to 11 bits can be transmitted in case of an extended CP. A bit stream may be encoded to 20 bits by an RM code and then modulated in QPSK. Before QPSK modulation, the coded bits may be scrambled.

TABLE 7

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |

TABLE 7-continued

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel-coded bits $b_0, b_1, b_2, b_3, \ldots, b_{B-1}$ may be generated by Equation 2.

$$b_i = \sum_{n=0}^{A-1} (a_n \cdot M_{i,n}) \bmod 2 \quad \text{Equation 2}$$

where $i = 0, 1, 2, \ldots, B-1$.

Table 8 illustrates a UCI field for feedback of a broadband report (a single antenna port, transmit diversity, or open loop spatial multiplexing PDSCH) CQI.

TABLE 8

| Field | Bandwidth |
|---|---|
| Broadband CQI | 4 |

Table 9 illustrates a UCI field for feedback of a broadband CQI and a PMI. This field reports transmission of a closed loop spatial multiplexing PDSCH.

TABLE 9

| | Bandwidth | | | |
|---|---|---|---|---|
| | 2 antenna ports | | 4 antenna ports | |
| Field | Rank = 1 | Rank = 2 | Rank = 1 | Rank > 1 |
| Broadband CQI | 4 | 4 | 4 | 4 |
| Spatial-domain differential CQI | 0 | 3 | 0 | 3 |
| PMI | 2 | 1 | 4 | 4 |

Table 10 illustrates a UCI field to feedback an RI for a broadband report.

TABLE 10

| | Bit widths | | |
|---|---|---|---|
| | | 4 antenna ports | |
| Field | 2 antenna ports | Up to 2 layers | Up to 4 layers |
| RI | 1 | 1 | 2 |

Figure 19:
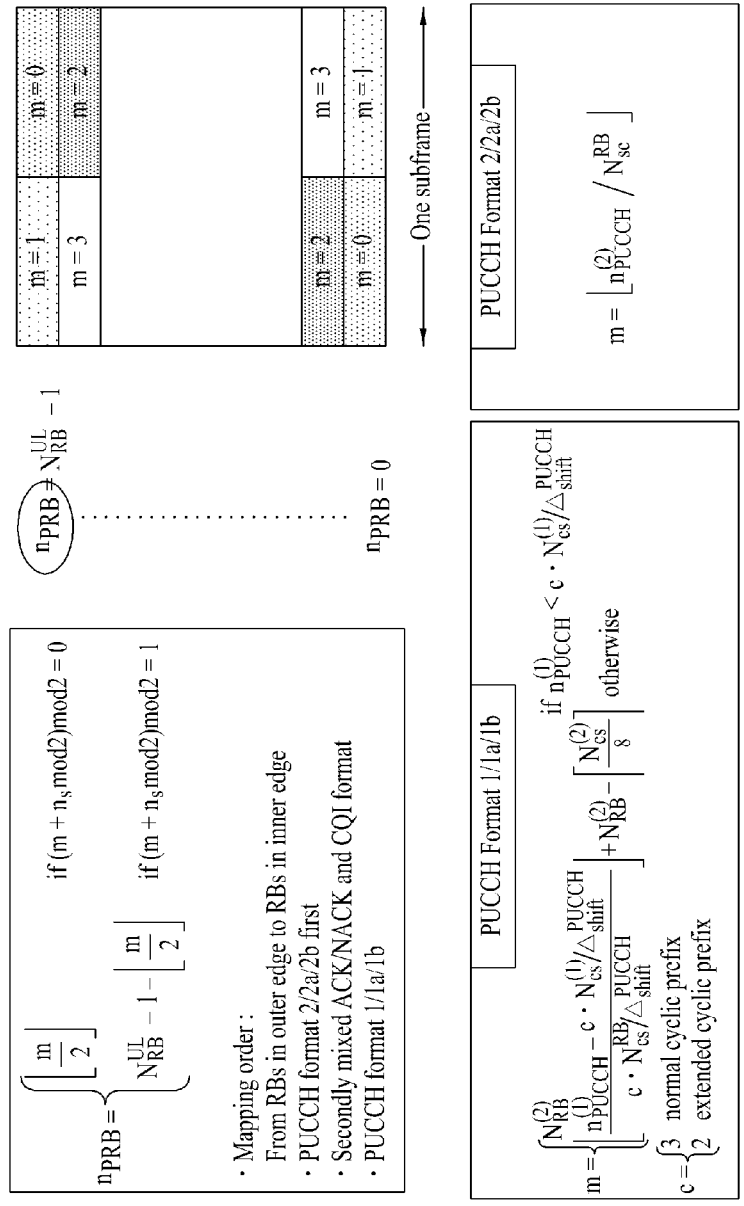
FIG. 19 illustrates PRB allocation.

FIG. 19 illustrates PRB allocation. Referring to FIG. 19, a PRB may be used to carry a PUCCH in slot $n_s$.

A multi-carrier system or Carrier Aggregation (CA) system is a system using a plurality of carriers each having a narrower bandwidth than a target bandwidth in order to support a broadband. When a plurality of carriers each having a narrower bandwidth than a target band are aggregated, the bandwidth of each of the aggregated carriers may be limited to a bandwidth used in a legacy system in order to ensure backward compatibility with the legacy system. For example, the legacy LTE system supports 1.4, 3, 5, 10, 15, and 20 MHz and the LTE-A system evolved from the LTE system may support a broader bandwidth than 20 MHz using only bandwidths supported by the LTE system. Alternatively, CA may be supported by defining a new bandwidth irrespective of the bandwidths used in the legacy system. The term multi-carrier is interchangeably used with CA and spectrum aggregation. In addition, CA covers both contiguous CA and non-contiguous CA.

Figure 20:
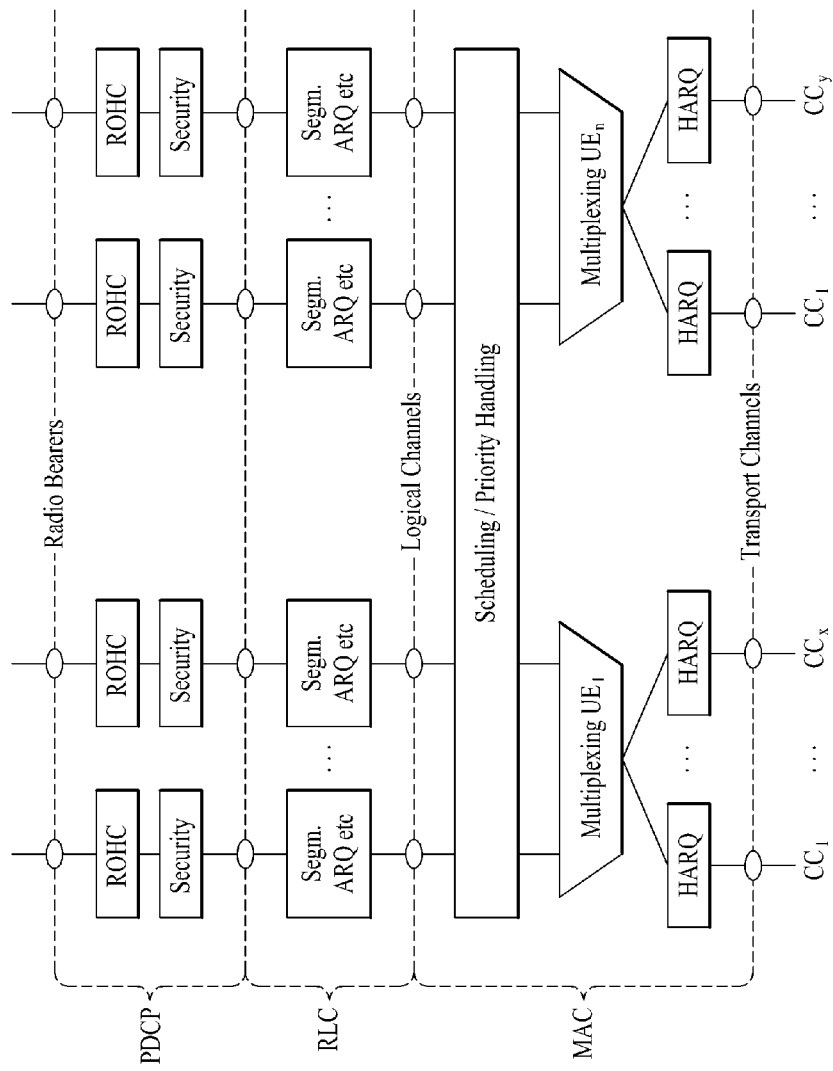
FIG. 20 is a conceptual view illustrating DownLink Component Carrier (DL CC) management at a BS.
Figure 21:
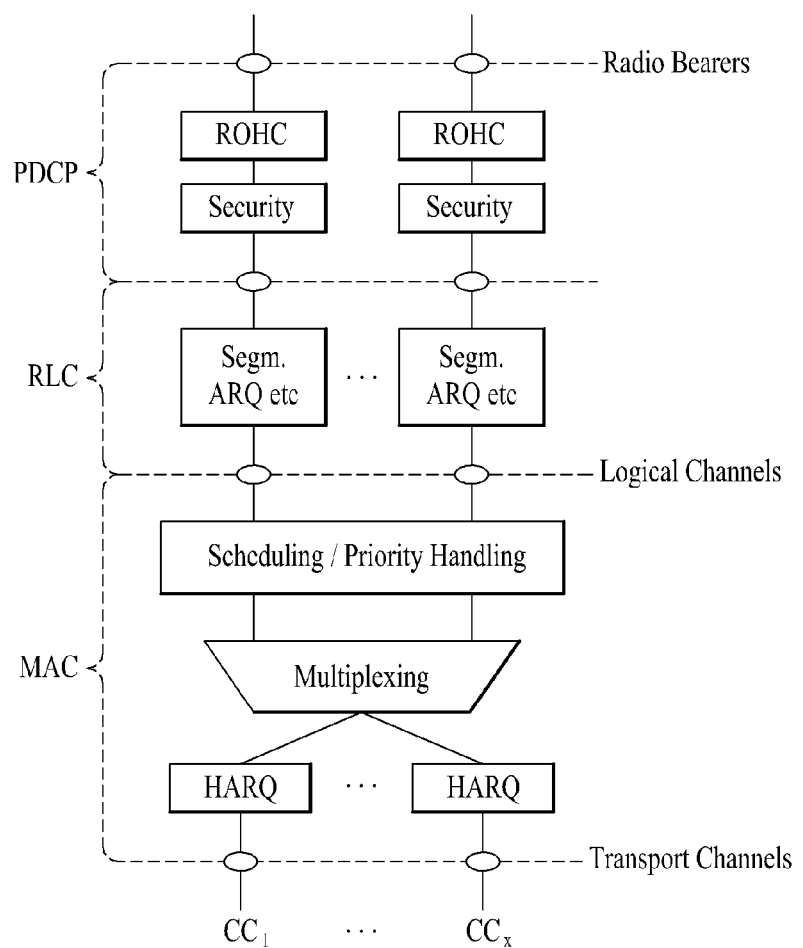
FIG. 21 illustrates a conceptual view illustrating UpLink CC (UL CC) management at a UE.

FIG. 20 is a conceptual view illustrating DL CC management at a BS and FIG. 21 illustrates a conceptual view illustrating UL CC management at a UE. For the convenience' sake of description, a higher layer will be referred simply as a MAC layer in FIGS. 19 and 20.

Figure 22:
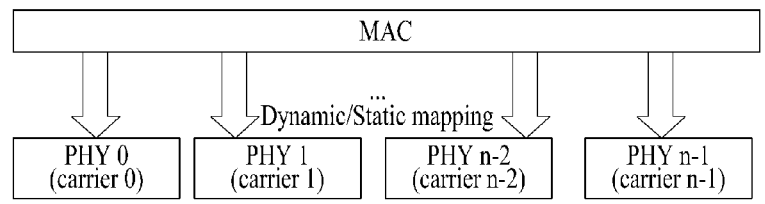
FIG. 22 is a conceptual view illustrating multi-carrier management of one Medium Access Control (MAC) layer at a BS.
Figure 23:
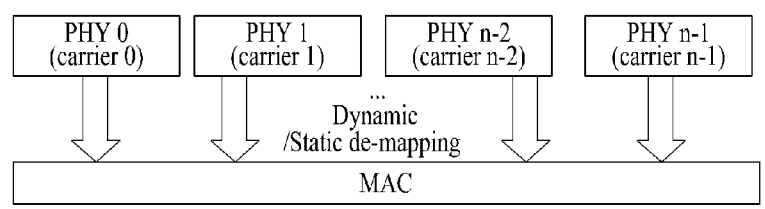
FIG. 23 is a conceptual view illustrating multi-carrier management of one MAC layer at a UE.

FIG. 22 is a conceptual view illustrating multi-carrier management of one MAC layer at a BS and FIG. 23 is a conceptual view illustrating multi-carrier management of one MAC layer at a UE.

Referring to FIGS. 22 and 23, one MAC layer performs transmission and reception by managing and operating one or more frequency carriers. Because the frequency carriers managed by the single MAC layer do not need to be contiguous, this multi-carrier management scheme is more flexible in terms of resource management. In FIGS. 22 and 23, one PHYsical (PHY) layer refers to one CC, for the convenience' sake. Yet, a PHY layer is not necessarily an independent Radio Frequency (RF) device. While one independent RF device generally corresponds to one PHY layer, it may include a plurality of PHY layers.

Figure 24:
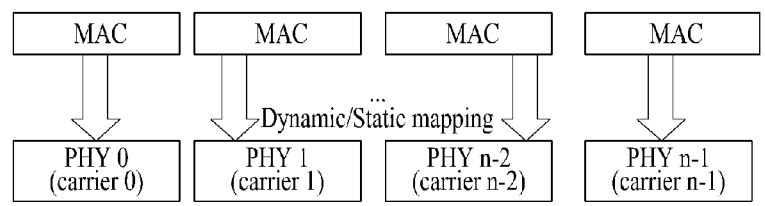
FIG. 24 is a conceptual view illustrating multi-carrier management of a plurality of MAC layers at a BS.
Figure 25:
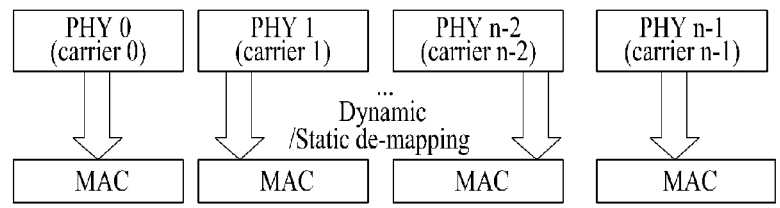
FIG. 25 is a conceptual view illustrating multi-carrier management of a plurality of MAC layers at a UE.
Figure 26:
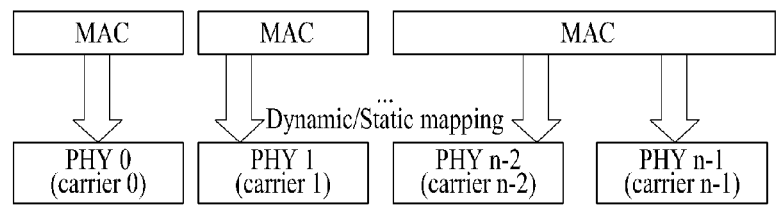
FIG. 26 is another conceptual view illustrating multi-carrier management of a plurality of MAC layers at a BS.
Figure 27:
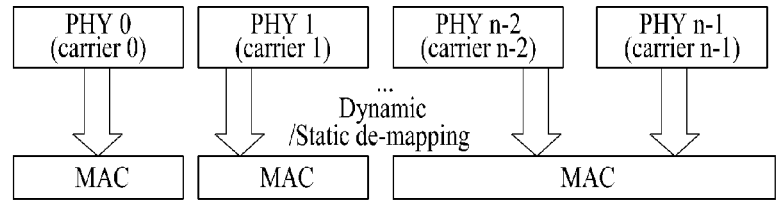
FIG. 27 is another conceptual view illustrating multi-carrier management of a plurality of MAC layers at a UE.

FIG. 24 is a conceptual view illustrating multi-carrier management of a plurality of MAC layers at a BS, FIG. 25 is a conceptual view illustrating multi-carrier management of a plurality of MAC layers at a UE, FIG. 26 is another conceptual view illustrating multi-carrier management of a plurality of MAC layers at a BS, and FIG. 27 is another conceptual view illustrating multi-carrier management of a plurality of MAC layers at a UE.

Apart from the structures illustrated in FIGS. 22 and 23, a plurality of MAC layers may control a plurality of carriers, as illustrated in FIGS. 24 to 27.

Each MAC layer may control one carrier in a one-to-one correspondence as illustrated in FIGS. 24 and 25, whereas each MAC layer may control one carrier in a one-to-one correspondence, for some carriers and one MAC layer may control one or more of the remaining carriers as illustrated in FIGS. 26 and 27.

The above-described system uses a plurality of carriers, that is, first to $N^{th}$ carriers and the carriers may be contiguous or non-contiguous irrespective of downlink or uplink. A TDD system is configured to use N carriers such that downlink transmission and uplink transmission take place on each carrier, whereas an FDD system is configured to use a plurality of carriers for each of downlink transmission and uplink transmission. The FDD system may support asymmetrical CA in which different numbers of carriers and/or carriers having different bandwidths are aggregated for downlink and uplink.

When the same number of CCs are aggregated for downlink and uplink, all CCs can be configured with backward compatibility with the legacy system. However, CCs without backward compatibility are not excluded from the present invention.

Figure 28:
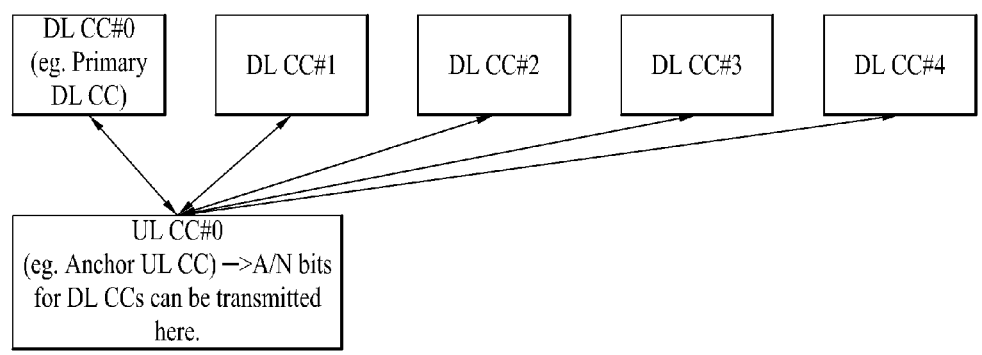
FIG. 28 illustrates asymmetrical Carrier Aggregation (CA) in which five DL CCs are linked to one UL CC.

FIG. 28 illustrates exemplary asymmetrical CA in which five DL CCs are linked to a single UL CC. This asymmetrical CA may be set from the perspective of transmitting UCI. That is, DL CC-UL CC linkage for UCI may be configured to be different from DL CC-UL CC linkage for data. For the convenience' sake, if it is assumed that each DL CC can carry up to two codewords and the number of ACK/NACKs for each CC depends on the maximum number of codewords configured per CC (for example, if a BS configures up to two codewords for a specific CC, even though a specific PDCCH uses only one codeword on the CC, two ACK/NACKs are configured for the CC), at least two UL ACK/NACK bits are needed for each DL CC. In this case, to transmit ACK/NACKs for data received on five DL CCs on a single UL CC, at least ten ACK/NACK bits are needed. If a Discontinuous Transmission (DTX) state is also to be indicated for each DL CC, at least 12 bits ($=5^6=3125=11.61$ bits) are required for ACK/NACK transmission. Since up to two ACK/NACK bits are available in the conventional PUCCH Formats 1a and 1b, this structure cannot transmit increased ACK/NACK information. While CA is given as an example of a cause to increase the amount of UCI, this situation may also occur due to an increase in the number of antennas and the existence of a backhaul subframe in a TDD system and a relay system. Like ACK/NACK transmission, the amount of control information to be transmitted is also increased when control information related to a plurality of DL CCs is to be transmitted on a single UL CC. For example, transmission of CQI/PMI/RI information related to a plurality of DL CCs may increase UCI payload. While ACK/NACK information related to codeword(s) is described in the present invention by way of example, it is obviously to be understood that a transmission block corresponding to a codeword exists and the same thing is applicable to ACK/NACK information for transmission block(s).

In FIG. 28, a UL anchor CC (a UL PCC or a UL primary CC) is a CC that delivers a PUCCH or UCI, determined cell-specifically/UE-specifically. A DTX state may be fed back explicitly or may be fed back so as to share the same state with a NACK.

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. If CA is supported, the linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. Each of the PCell and the SCell may collectively be referred to as a serving cell. Accordingly, a single serving cell composed of a PCell only exists for a UE in RRC_Connected state, for which CA is not configured or which does not support CA. On the other hand, one or more serving cells exist, including a PCell and SCell(s), for a UE in RRC_CONNECTED state, for which CA is configured. For CA, a network may configure one or more SCells in addition to an initially configured PCell, for a UE supporting CA during a connection establishment after an initial security activation operation is initiated. Therefore, the term PCC is interchangeably used with the terms PCell, primary (radio) resources, and primary frequency resources. Similarly, the term SCC is interchangeably used with the terms SCell, secondary (radio) resources, and secondary frequency resources.

Now a description will be given of a method for efficiently transmitting increased UCI with reference to drawings. Specifically, a new PUCCH format, a signal processing operation, and a resource allocation method for transmitting increased UCI are proposed. The new PUCCH format proposed by the present invention is called CA PUCCH Format or PUCCH Format 3, considering that FUCCH Format 1 to PUCCH Format 2 are defined in legacy LTE Release 8/9. The technical features of the proposed PUCCH format may be applied to any physical channel (e.g. a PUSCH) that can deliver UCI in the same manner or in a similar manner. For example, an embodiment of the present invention is applicable to a periodic PUSCH structure for transmitting control information periodically or a non-periodic PUSCH structure for transmitting control information non-periodically.

The following drawings and embodiment of the present invention will be described, focusing on a case where the UCI/RS symbol structure of the legacy LTE PUCCH Format 1/1a/1b (in case of a normal CP) is used as a subframe-level/slot-level UCI/RS symbol structure applied to PUCCH Format 3. However, the subframe-level/slot-level UCI/RS symbol structure of PUCCH Format 3 is defined to provide an example, which should not be construed as limiting the present invention. The number and positions of UCI/RS symbols may be changed freely in PUCCH Format 3 of the present invention according to a system design. For example, PUCCH Format 3 according to an embodiment of the present invention may be defined using the RS symbol structure of the legacy LTE PUCCH Format 2/2a/2b.

PUCCH Format 3 according to the embodiment of the present invention may be used to transmit UCI of any type or size. For example, information such as an HARQ ACK/NACK, a CQI, a PMI, an RI, and an SR may be transmitted in PUCCH Format 3 according to the embodiment of the present invention may. This information may have payload of any size. For the convenience' sake of description, the following description will focus on transmission of ACK/NACK information in PUCCH Format 3 according to the present invention.

FIGS. 29 to 32 illustrate the structure of PUCCH Format 3 that can be used in the present invention and a signal processing operation for PUCCH Format 3. Especially, FIGS. 29 to 32 illustrate a DFT-based PUCCH format. According to the DFT-based PUCCH structure, a PUCCH is DFT-precoded and spread with a time-domain OC at an SC-FDMA level, prior to transmission. Hereinafter, the DFT-based PUCCH format will be referred to as PUCCH Format 3.

Figure 29:
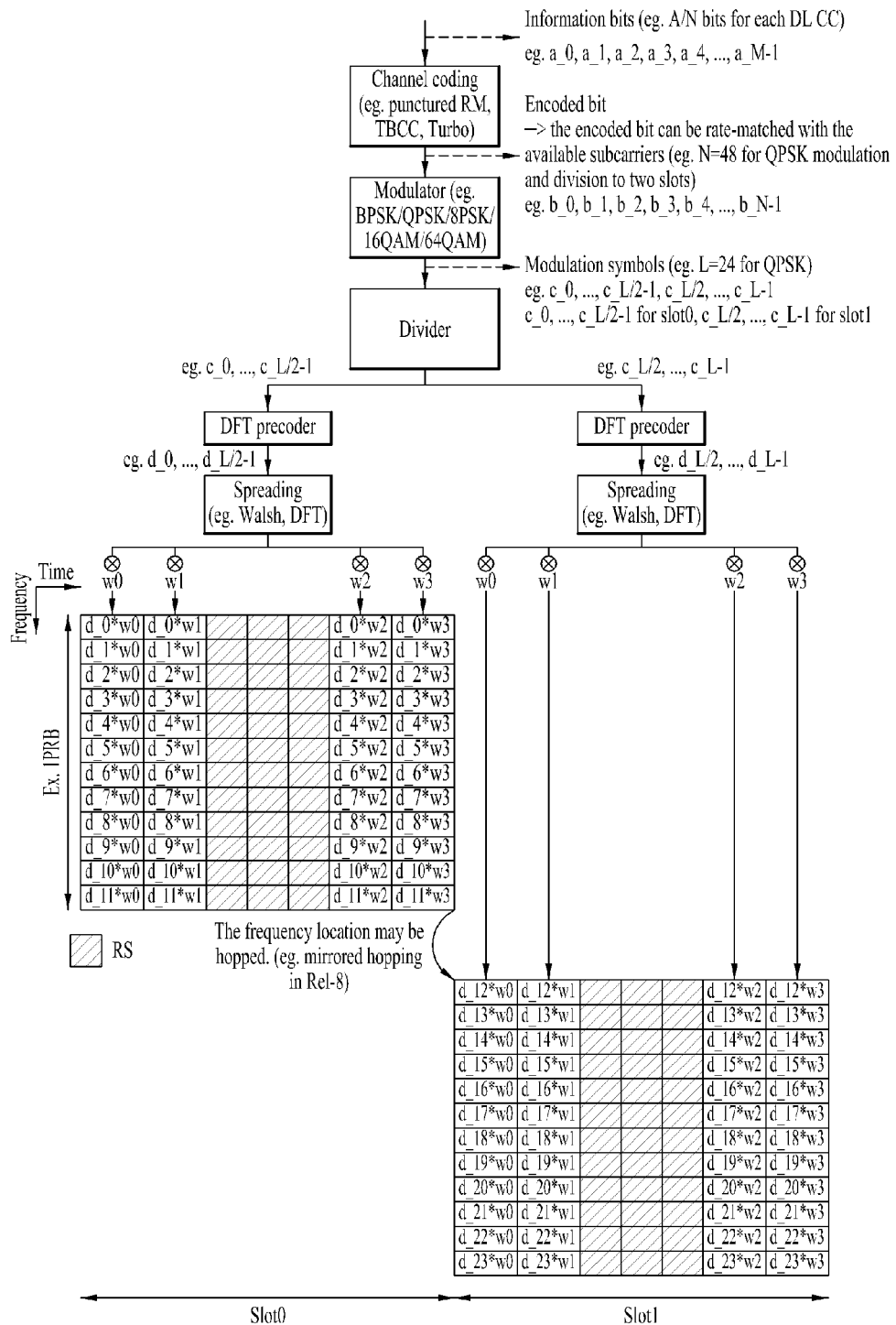
FIGS. 29 to 32 illustrate the structure of PUCCH Format 3 and a signal processing operation for PUCCH Format 3, to which the present invention is applied.

FIG. 29 illustrates an exemplary structure of PUCCH Format 3 using an OC with SF=4. Referring to FIG. 29, a channel coding block channel-encodes transmission bits a_0, a_1, . . . , a_M−1 (e.g. multiple ACK/NACK bits), thus creating coded bits (or a codeword), b_0, b_1, . . . , b_N1. M is the size of transmission bits and N is the size of coded bits. The transmission bits include UCI, for example, multiple ACK/NACKs for a plurality of data (or PDSCHs) received on a plurality of DL CCs. Herein, the transmission bits a_0, a_1, . . . , a_M−1 are jointly encoded irrespective of the type, number, or size of UCI that forms the transmission bits. For example, if the transmission bits include multiple ACK/NACKs for a plurality of DL CCs, channel coding is performed on the entire bit information, rather than per DL CC or per ACK/NACK bit. A single codeword is generated by the channel coding. Channel coding includes, but not limited to, repetition, simplex coding, RM coding, punctured RM coding, Tail-Biting Convolutional Coding (TBCC), Low-Density Parity-Check (LDPC) coding, or turbo coding. While not shown, the coded bits may be rate-matched, taking into account a modulation order and the amount of resources. The rate matching function may be incorporated into the channel coding block or implemented in a separately procured function block. For example, the channel coding block may produce a single codeword by performing (32, 0) RM coding on a plurality of pieces of control information and may subject the single codeword to cyclic buffer rate-matching.

A modulator generates modulation symbols c_0, c_1, . . . , c_L−1 by modulating the coded bits b_0, b_1, . . . , b_M−1. L is the size of modulation symbols. A modulation scheme is performed by changing the amplitude and phase of a transmission signal. The modulation scheme may be n-Phase Shift Keying (n-PSK) or n-Quadrature Amplitude Modulation (QAM) (n is 2 or a larger integer). More specifically, the modulation scheme may be BPSK, QPSK, 8-PSK, QAM, 16-QAM, or 64-QAM.

A divider divides the modulation symbols c_0, c_1, . . . , c_L−1 into slots. The order/pattern/scheme of dividing modulation symbols into slots is not limited to a specific one. For instance, the divider may divide the modulation symbols into slots, sequentially starting from the first modulation symbol (localized scheme). In this case, the modulation symbols c_0, c_1, . . . , c_L/2−1 may be allocated to slot 0 and the modulation symbols c_L/2, c_L/2+1, . . . , c_L−1 may be allocated to slot 1. When the modulation symbols are allocated to the slots, they may be interleaved (or permuted). For example, even-numbered modulation symbols may be allocated to slot 0 and odd-numbered modulation symbols may be allocated to slot 1. The division may precede the modulation.

A DFT precoder performs DFT precoding (e.g. 12-point DFT) on the modulation symbols allocated to the slots in order to generate a single carrier waveform. Referring to FIG. 29, the modulation symbols c_0, c_1, . . . , c_L/2−1 allocated to slot 0 are DFT-precoded to d_0, d_1, . . . , d_L/2−1 and the modulation symbols c_L/2, c_L/2+1, . . . , c_L−1 allocated to slot 1 are DFT-precoded to d_L/2, d_L/2+1, . . . , d_L−1. DFT precoding may be replaced with another linear operation (e.g. walsh precoding).

A spreading block spreads DFT signals at an SC-FDMA symbol level (in the time domain). The SC-FDMA symbol-level time-domain spreading is performed using a spreading code (sequence). The spreading code includes a quasi-orthogonal code and an orthogonal code. The quasi-orthogonal code includes, but not limited to, a Walsh code and a DFT code. While an orthogonal code is taken as a main example of the spreading code herein for the convenience' sake of description, the orthogonal code may be replaced with a quasi-orthogonal code. The maximum value of a spreading code size or a Spreading Factor (SF) is limited by the number of SC-FDMA symbols used for transmitting control information. For example, if four SC-FDMA symbols carry control information in one slot, an orthogonal code of length 4, w0, w1, w2, w3 can be used in each slot. The SF means the degree to which control information is spread. The SF may be related to the multiplexing order or antenna multiplexing order of a UE. The SF may be changed to 1, 2, 3, 4, . . . depending on system requirements. An SF may be predefined between a BS and a UE or the BS may indicate an SF to the UE by DCI or RRC signaling. For example, if one of SC-FDMA symbols for control information is punctured to transmit an SRS, a spreading code with a decreased SF (e.g. SF=3 instead of SF=4) may be applied to the control information in a corresponding slot.

A signal generated from the above operation is mapped to subcarriers in a PRB and converted to a time-domain signal by IFFT. The time-domain signal is added with a CP and the resulting SC-FDMA symbols are transmitted through an RF end.

On the assumption that ACK/NACKs are transmitted for five DL CCs, each operation will be described in greater detail. If each DL CC can carry two PDSCHs, ACK/NACK bits for the PDSCHs may be 12 bits, including a DTX state. Given QPSK and time spreading with SF=4, the size of a coding block (after rate matching) may be 48 bits. The coded bits are modulated to 24 QPSK symbols and the QPSK symbols are divided into two slots, 12 QPSK symbols for each slot. The 12 QPSK symbols of each slot are converted to 12 DFT symbols by DFT, spread to four SC-FDMA symbols using an OC with SF=4 in the time domain, and then mapped. Because 12 bits are transmitted on [2 bits×12 subcarriers×8 SC-FDMA symbols], the coding rate is 0.0625 (=12/192). If SF=4, up to four UEs may be multiplexed per one PRB.

Figure 30:
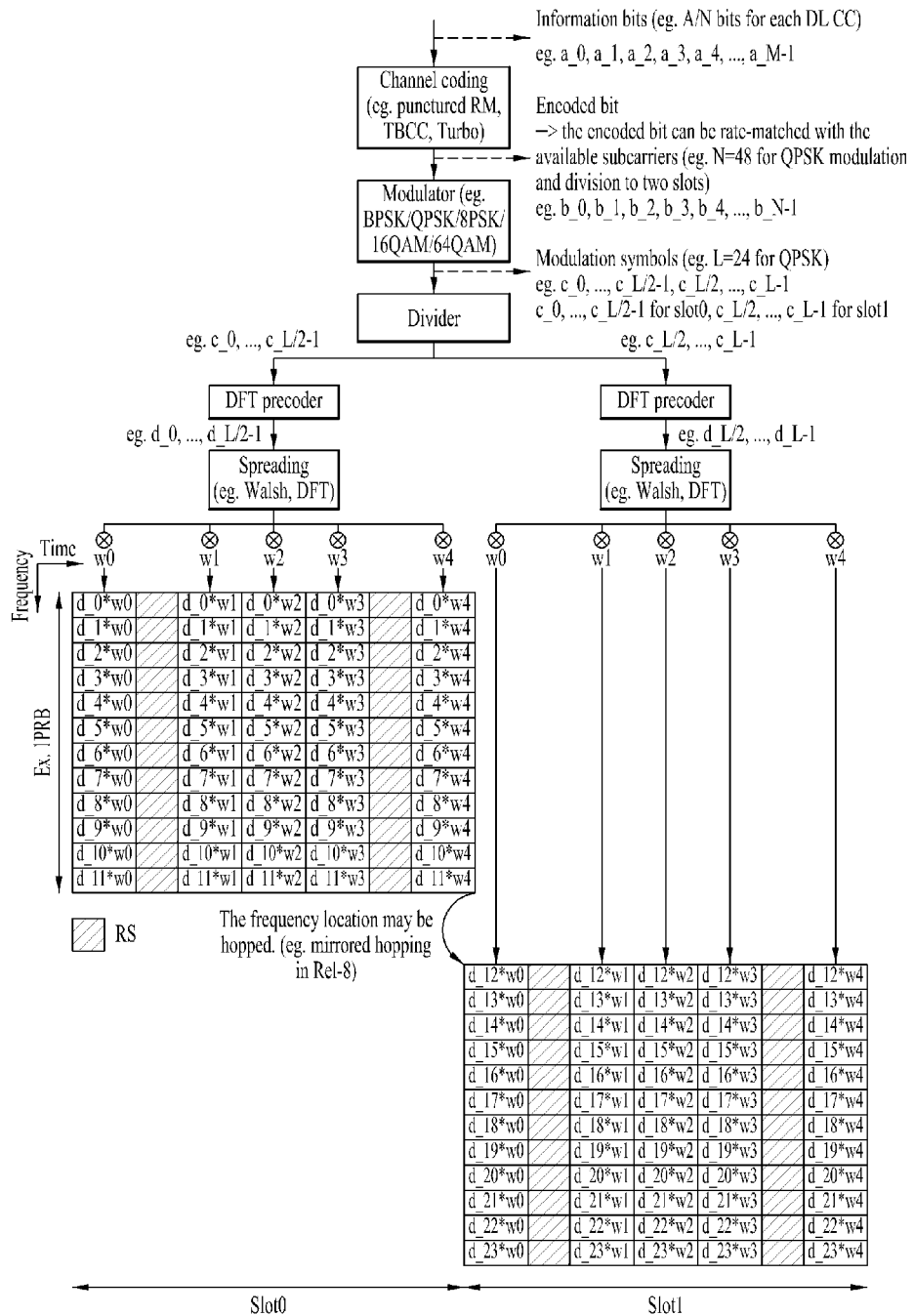

FIG. 30 illustrates an exemplary structure of PUCCH Format 3 using an OC with SF=5.

The basic signal processing operation is performed in the same manner as described with reference to FIG. 29 except for the number and positions of UCI SC-FDMA symbols and RS SC-FDMA symbols. A spreading block may be generated in advanced at the front end of a DFT precoder.

In FIG. 30, RSs may be configured in the same configuration as used in the LTE system. For example, a base sequence may be cyclically shifted. The multiplexing capacity of a data part is 5 in view of SF=5. However, the multiplexing capacity of an RS part is determined by a CS interval $\Delta_{shift}^{PUCCH}$. For example, given a multiplexing capacity of $12/\Delta_{shift}^{PUCCH}$, the multiplexing capacities for the cases where $\Delta_{shift}^{PUCCH}=1$, $\Delta_{shift}^{PUCCH}=2$, and $\Delta_{shift}^{PUCCH}=3$ are respectively 12, 6, and 4. In FIG. 30, while the multiplexing capacity of the data part is 5 due to SF=5, the multiplexing capacity of the RS part is 4 in case of $\Delta_{shift}^{PUCCH}$. Therefore, an overall multiplexing capacity may be limited to the smaller of the two values, 4.

Figure 31:
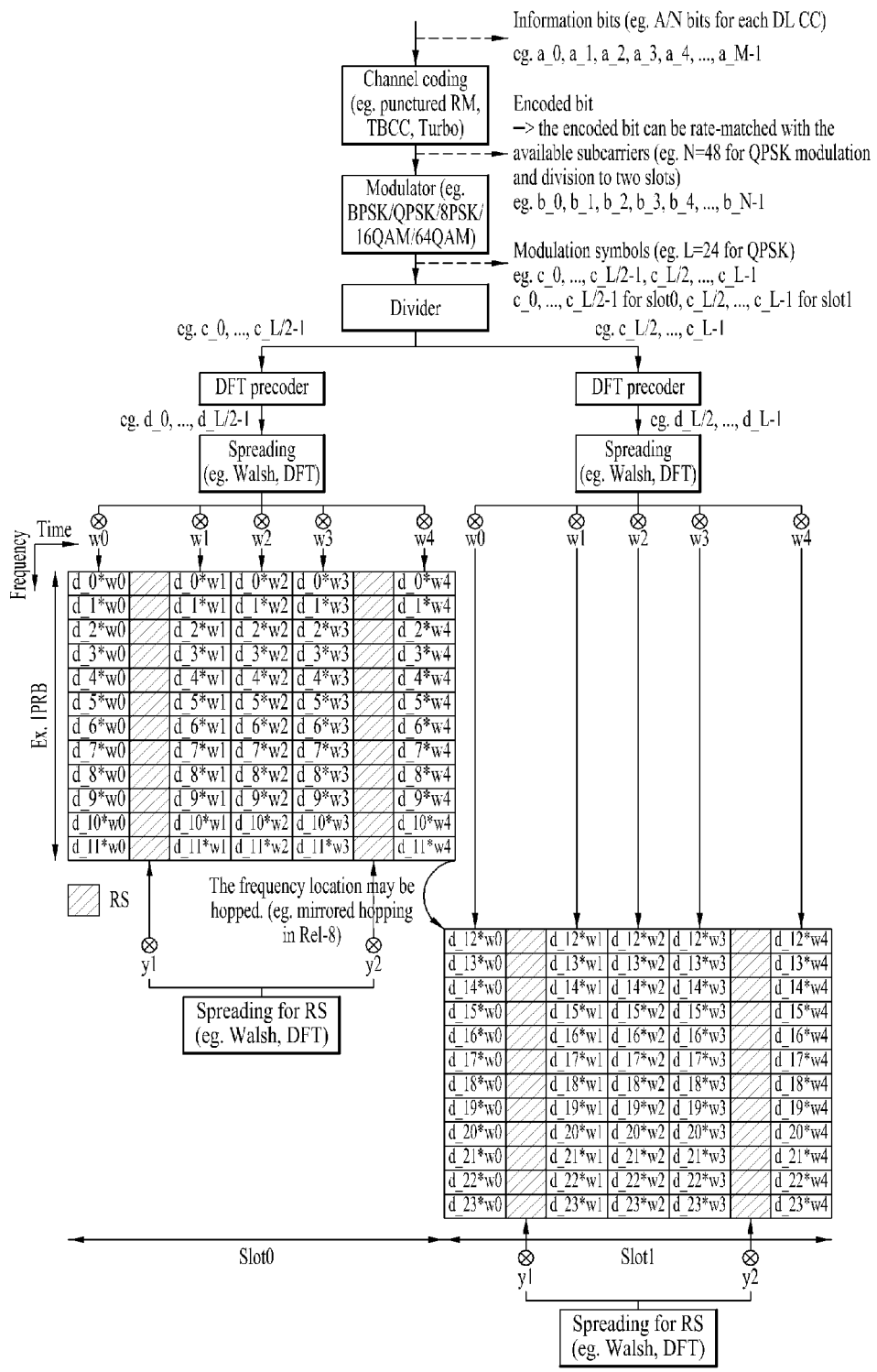

FIG. 31 illustrates an exemplary structure of PUCCH Format 3 that can increase a multiplexing capacity at a slot level.

An overall multiplexing capacity can be increased by applying SC-FDMA symbol-level spreading described with reference to FIGS. 29 and 30 to RSs. Referring to FIG. 31, the multiplexing capacity is doubled by applying a Walsh cover (or a DFT code cover) within a slot. As a consequence, the multiplexing capacity is 8 even in case of $\Delta_{shift}^{PUCCH}$, thereby preventing a decrease in the multiplexing capacity of a data part. In FIG. 31, an OC for RSs may be [y1 y2]=[1 1], [y1 y2]=[1 −1], or their modification (e.g. [j j] [j −j], [1 j] [1 −j], etc.).

Figure 32:
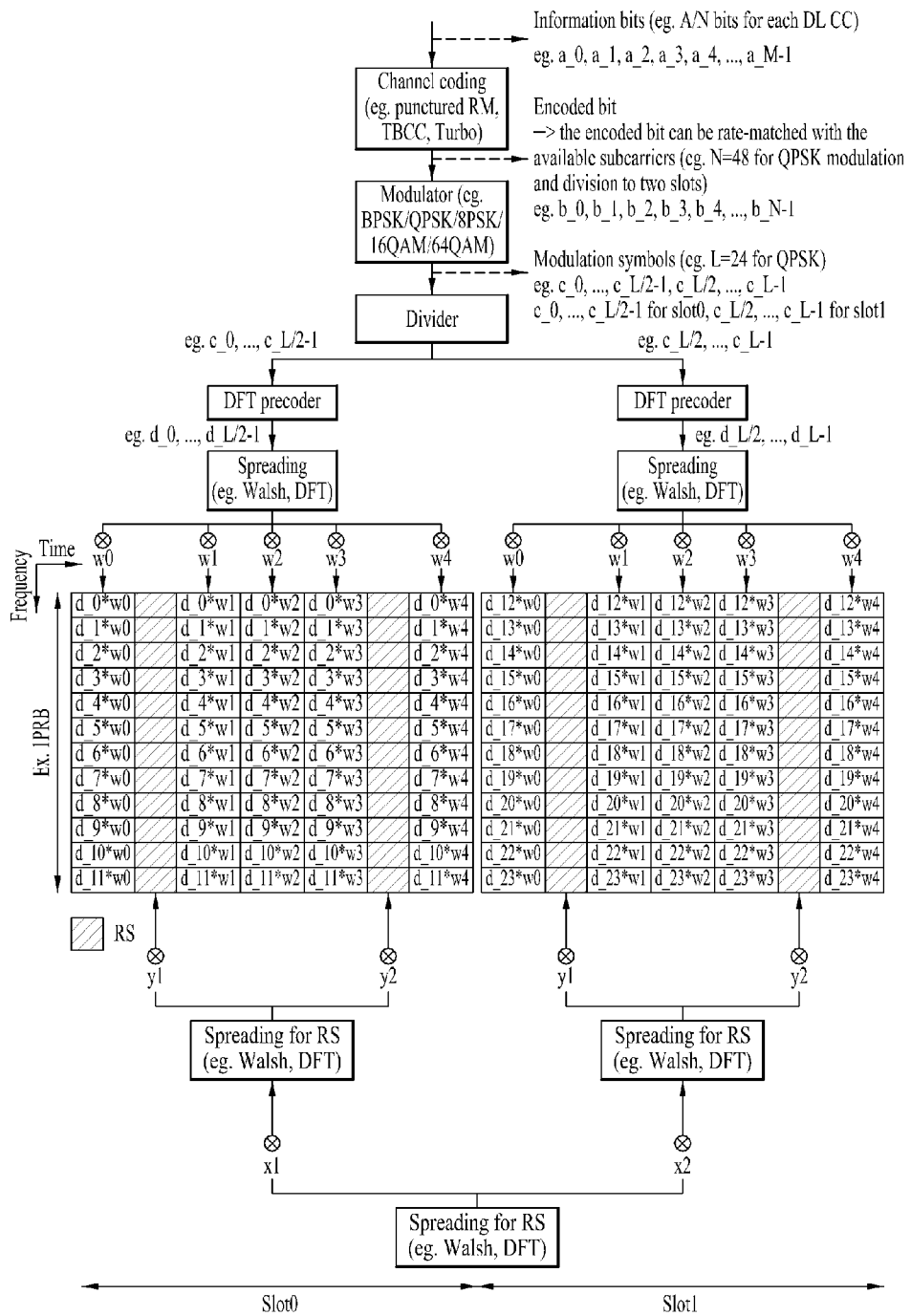

FIG. 32 illustrates an exemplary structure of PUCCH Format 3 that can increase a multiplexing capacity at a subframe level.

Without slot-level frequency hopping, use of a Walsh cover on a slot basis can further double a multiplexing capacity. As described before, [x1 x2]=[1 1], [1 −1], or a modification of them may be used as an OC.

For reference, the processing operation of PUCCH Format 3 is not limited to the orders illustrated in FIGS. 29 to 32.

FIG. 33 illustrates an ACK/NACK information transmission structure based on channel selection, to which the present invention is applied. Referring to FIG. 33, two PUCCH resources or PUCCH channels (PUCCH resource #0 and PUCCH resource #1 or PUCCH channel #0 and PUCCH channel #1) may be configured in PUCCH Format 1b for 2-bit ACK/NACK information.

In the case of transmitting 3-bit ACK/NACK information, 2 bits of the 3-bit ACK/NACK information may be represented in PUCCH Format 1b and the other 1 bit of the 3-bit ACK/NACK information may be represented depending on a PUCCH resource selected from the two PUCCH resources. For example, since one of ACK/NACK information transmission in PUCCH resource #0 and ACK/NACK information transmission in PUCCH resource #1 (two cases) can be indicated by the 1 bit, a total of 3 ACK/NACK bits may be represented.

Table 11 illustrates an example of transmitting 3-bit ACK/NACK information by channel selection. It is assumed herein that two PUCCH resources are configured.

TABLE 11

| ACK/NACK | Ch1 RS | Ch1 Data | Ch2 RS | Ch2 Data |
|---|---|---|---|---|
| N, N, N | 1 | 1 | 0 | 0 |
| N, N, A | 1 | −j | 0 | 0 |
| N, A, N | 1 | j | 0 | 0 |
| N, A, A | 1 | −1 | 0 | 0 |
| A, N, N | 0 | 0 | 1 | 1 |
| A, N, A | 0 | 0 | 1 | −j |
| A, A, N | 0 | 0 | 1 | j |
| A, A, A | 0 | 0 | 1 | −1 |

In Table 11, 'A' denotes ACK information and 'N' denotes NACK information or NACK/DTX information. '1, −1, j, −j' are four complex-valued modulation symbols to which 2-bit transmission information b(0) and b(1) can be modulated in QPSK. b(0) and b(1) are binary transmission bits transmitted in a selected PUCCH resource. For example, the binary transmission bits b(0) and b(1) may be mapped to a complex-valued modulation symbol and transmitted in a PUCCH resource according to Table 11.

TABLE 12

| Modulation | Binary transmission bits b(0), b(1) | Complex-valued modulation symbol |
|---|---|---|
| QPSK | 0, 0 | 1 |
|  | 0, 1 | −j |
|  | 1, 0 | j |
|  | 1, 1 | −1 |

FIG. 34 illustrates an ACK/NACK information transmission structure based on enhanced channel selection, to which the present invention is applied. Referring to FIG. 34, two PUCCH resources (PUCCH resource #0 and PUCCH resource #1) may be configured for PUCCH Format 1a to transmit 1-bit ACK/NACK information.

In case of transmitting 3-bit ACK/NACK information, one bit of the 3-bit ACK/NACK information may be represented in PUCCH Format 1a, another bit of the 3-bit ACK/NACK information may be represented according to a PUCCH resource (PUCCH resource #0 or PUCCH resource #1) carrying the ACK/NACK information, and the other bit of the 3-bit ACK/NACK information may be represented according to a resource carrying an RS.

That is, 2 bits (4 cases) can be represented by selecting one of the case where ACK/NACK information is transmitted in PUCCH resource #0 and an RS is transmitted in a resource corresponding to PUCCH resource #0, the case where ACK/NACK information is transmitted in PUCCH resource #1 and an RS is transmitted in a resource corresponding to PUCCH resource #1, the case where ACK/NACK information is transmitted in PUCCH resource #0 and an RS is transmitted in a resource corresponding to PUCCH resource #1, and the case where ACK/NACK information is transmitted in PUCCH resource #1 and an RS is transmitted in a resource corresponding to PUCCH resource #0. In this manner, 3-bit ACK/NACK information may be represented.

Table 13 illustrates an example of delivering 3-bit ACK/NACK information by enhanced channel selection. It is assumed herein that two PUCCH resources are configured.

TABLE 13

| ACK/NACK | Ch1 RS | Ch1 Data | Ch2 RS | Ch2 Data |
|---|---|---|---|---|
| N, N, N | 1 | 1 | 0 | 0 |
| N, N, A | 1 | −1 | 0 | 0 |
| N, A, N | 0 | 1 | 1 | 0 |
| N, A, A | 0 | −1 | 1 | 0 |
| A, N, N | 1 | 0 | 0 | 1 |
| A, N, A | 1 | 0 | 0 | −1 |
| A, A, N | 0 | 0 | 1 | 1 |
| A, A, A | 0 | 0 | 1 | −1 |

Compared to Table 12 using channel selection, Table 13 using enhanced channel selection is meaningful in that BPSK complex-valued symbols may be mapped to a PUCCH resource.

While it has been described that two PUCCH resources are configured to transmit 3-bit ACK/NACK information in FIGS. 33 and 34, by way of example, the number of transmission bits of ACK/NACK information and the number of PUCCH resources may vary. Obviously, the same principle applies to the case where UCI other than ACK/NACK information or both ACK/NACK information and other UCI are transmitted.

Table 14 illustrates an example of configuring two PUCCH resources and indicating six ACK/NACK states by channel selection.

TABLE 14

| HARQ-ACK(0), HARQ-ACK(1) | $n^{(1)}_{PUCCH}$ | b(0), b(1) |
|---|---|---|
| ACK, ACK | $n^{(1)}_{PUCCH,1}$ | 1, 1 |
| ACK, NACK/DTX | $n^{(1)}_{PUCCH,0}$ | 0, 1 |
| NACK/DTX, ACK | $n^{(1)}_{PUCCH,1}$ | 0, 0 |

TABLE 14-continued

| HARQ-ACK(0), HARQ-ACK(1) | $n^{(1)}_{PUCCH}$ | b(0), b(1) |
|---|---|---|
| NACK/DTX, NACK | $n^{(1)}_{PUCCH,1}$ | 1, 0 |
| NACK, DTX | $n^{(1)}_{PUCCH,0}$ | 1, 0 |
| DTX, DTX | N/A | N/A |

Table 15 illustrates an example of configuring three PUCCH resources and indicating 11 ACK/NACK states by channel selection.

TABLE 15

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

Table 16 illustrates an example of configuring four PUCCH resources and indicating 20 ACK/NACK states by channel selection.

TABLE 16

| HARQ-ACK(0), HARQ-ACK(1), HARQ-ACK(2), HARQ-ACK(3) | $n^{(1)}_{PUCCH}$ | b(0), b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

Meanwhile, a plurality of types of UCI and an RS are transmitted on PUCCHs largely in the following cases.

(1) SR (Scheduling Request) information+ACK/NACK information (2) CQI (Channel Quality Information)+ACK/NACK information (3) SR information+CQI (4) SR information+CQI+ACK/NACK information (5) At least one of the cases+RS Now, a description will be given of UCI transmission that maintains system performance even though a plurality of types of UCI and an RS are transmitted simultaneously. In addition, a method for efficiently transmitting UCI in limited resources will be described. While the following description centers on transmission of ACK/NACK information for the convenience' sake, to which the present invention is not limited, it is to be clearly understood that various types of UCI can be transmitted in the same manner.

First of all, simultaneous transmission of SR information and ACK/NACK information according to an embodiment of the present invention will be described.

To simultaneously transmit 1-bit SR information and 2-bit ACK/NACK information, ACK/NACK information may be transmitted in an SR PUCCH resource in PUCCH Format 1b according to an embodiment of the present invention.

For example, if ACK/NACK responses for two DL CCs, DL CC #0 and DL CC #1 are ACK and ACK, binary transmission bits corresponding to ACK and ACK may be '1, 1', which may be expressed as a QPSK complex-valued modulation symbol '−1'. The complex-valued modulation symbol may be transmitted in an SR PUCCH resource. While this method has been described in the context of FDD, it may also be applied to TDD in a similar manner.

In another embodiment of the present invention, if ACK/NACK information exceeds 2 bits, the number of ACKs may be expressed in binary information bits. The binary information bits may be modulated in QPSK and the QPSK modulation symbol may be transmitted in an SR PUCCH resource. The same thing may apply to FDD.

Table 17 illustrates an example of simultaneously transmitting 1-bit SR information and ACK/NACK information having more than 2 bits in SR PUCCH resources.

TABLE 17

| Number of ACKs in ACK/NACK response | b(0), b(1) |
|---|---|
| 0 or none | 0, 0 |
| 1 | 1, 1 |
| 2 | 1, 0 |
| 3 | 0, 1 |
| 4 | 1, 1 |
| 5 | 1, 0 |
| 6 | 0, 1 |
| 7 | 1, 1 |
| 8 | 1, 0 |
| 9 | 0, 1 |

Referring to Table 17, when QPSK is adopted, a modulation symbol mapped to an SR PUCCH resource may represent two bits (four cases). Accordingly, if the number of ACKs is 0 or at least one DTX occurs (a UE does not know that a PDCCH has been transmitted), binary transmission bits are set to '0, 0'. The other binary transmission bits '1, 1', '1, 0', and '0, 1' indicate respectively that the numbers of ACKs are 1, 2, 3, then 4, 5, 6, and then 7, 8, 9, with a cycle of 3. Numbers of ACKs may be mapped to binary transmission bits in various manners. Meanwhile, a UE may determine the number of ACKs using a Downlink Assignment Index (DAI) for a DL CC. A BS transmits a DAI to the UE on a PDCCH and a DAI for each DL CC indicates the accumulative number of PDCCHs in a corresponding DL CC. That is, if a value indicated by the DAI is different from the number of PDCCHs, the UE may determine that a DTX has occurred. When at least one DTX occurs, binary transmission bits '0, 0' may be transmitted.

When 1-bit SR information and ACK/NACK information are to be simultaneously transmitted by channel selection, the number of transmission bits is increased by additionally configuring an ACK/NACK PUCCH resource according to a third embodiment of the present invention.

For example, in the case where two ACK/NACK PUCCH resources are configured and 3-bit ACK/NACK information is transmitted by channel selection, if 1-bit SR information is to be transmitted simultaneously with the 3-bit ACK/NACK information, two ACK/NACK PUCCH resources may be additionally configured and thus the 1-bit SR information and the 3-bit ACK/NACK information may be transmitted simultaneously in a total of four ACK/NACK PUCCH resources.

2-bit ACK/NACK information may be represented in PUCCH Format 1b, and the other 1-bit ACK/NACK information and the 1-bit SR information (2 bits, i.e. four cases) may be represented according to a PUCCH resource carrying the ACK/NACK information from among the four ACK/NACK PUCCH resources.

A method for additionally transmitting 1-bit SR information in the case where 1-bit SR information and ACK/NACK information are transmitted simultaneously by channel selection according to a fourth embodiment of the present invention will be described below.

For example, in the case where 2-bit ACK/NACK information is transmitted in two ACK/NACK PUCCH resources, if 1-bit SR information is to be transmitted simultaneously with the ACK/NACK information, 2 bits may be represented in PUCCH Format 1b and 1 bit may be transmitted according to a PUCCH resource carrying the ACK/NACK information. For example, if ACK/NACK information is transmitted in PUCCH resource #0, this may mean that there is no SR (or no resource request). If ACK/NACK information is transmitted in PUCCH resource #1, this may mean that there is an SR. The SR information may be represented as a modulation symbol mapped to a PUCCH resource.

Meanwhile, methods for transmitting 5-bit ACK/NACK information using M (e.g. M=4) ACK/NACK PUCCH resources to simultaneously transmit 1-bit SR information and 4-bit ACK/NACK information may be be defined according to embodiments of the present invention and 1 bit out of the 5 bits may be allocated to the SR information. Or a method for transmitting 5-bit ACK/NACK information using a DFT-S-OFDM structure may be defined and 1 bit may be allocated to SR information.

A method for bundling at least one transmission bit to simultaneously transmit 1-bit SR information and ACK/NACK information according to a fifth embodiment of the present invention will be described.

For example, to transmit 1-bit SR information and 4-bit ACK/NACK information simultaneously, a total of 5 bits should be transmitted. In this bundling method, the SR information and the ACK/NACK information are transmitted in fewer bits than 5 bits. The bundling method may be applied when a PUCCH format is not defined for transmission of 5-bit UCI.

In the case where 1-bit SR information is to be transmitted simultaneously with 4-bit ACK/NACK information, spatial bundling or CC bundling, which is bundling between codewords, may be performed. The spatial bundling or CC bundling may be performed by a pre-defined logic operation (e.g. logic AND operation) of ACK/NACKs. A 4-bit ACK/NACK may be reduced to 3 bits through 2-bit spatial bundling or CC bundling and thus a total of 4 bits may be transmitted, including 1-bit SR information. A DL CC subjected to bundling may be pre-defined. For instance, an ACK/NACK for a DL CC having the lowest or highest DL CC index may be bundled.

More specifically, in the case where there are two DL CCs, DL CC #0 and DL CC #1 and two codewords are transmitted on each DL CC, if a UE succeeds in PDCCH decoding of DL CC #0, responses for two related PDSCHs are ACKs, and the UE fails in PDCCH decoding of DL CC #1 (e.g. DTX), the UE may transmit ACK/NACK transmission bits set to '1100' (1 indicates ACK and 0 indicates NACK/DTX). When 1-bit SR information is to be transmitted together with the ACK/NACK bits and the SR information is set to '1' requesting resources to the BS, the UE may transmit 5 bits expressed as '11001' (in the case where the SR transmission bit resides at the end). The first two bits '11' indicate 'ACK, ACK' for codeword #0 and codeword #1 of DL CC #0, the next two bits '001' indicate 'NACK/DTX, NACK/DTX' for codeword #0 and codeword #1 of DL CC #1, and the last bit '1' indicates that the SR information is a resource request. If DL CC #1 (the highest DL CC index) is spatially bundled, four transmission bits '1101' are generated.

If the UE succeeds in PDCCH decoding of DL CC #0, responses for two related PDSCHs are ACKs, the UE succeeds in PDCCH decoding of DL CC #1, and the UE succeeds in decoding codeword #0 and fails in decoding codeword #1 on DL CC #1, ACK/NACK transmission bits are set to '1110'. If the SR information is set to '1' indicating that resources are requested to the BS, the transmission bits are '11101'. If DL CC #1 is spatially bundled, four transmission bits '1101' are created.

Thus, the transmission bits may be transmitted in a PUCCH format designed to transmit 4-bit UCI.

Now a method for simultaneously transmitting 1-bit SR information and ACK/NACK information by enhanced channel selection according to a sixth embodiment of the present invention will be described.

For example, Table 18 below illustrates an exemplary case where two PUCCH resources (PUCCH resource #0 and PUCCH resource #1) are configured and 3-bit ACK/NACK information is transmitted by channel selection.

TABLE 18

| ACK/NACK | Ch1 | | Ch2 | |
|---|---|---|---|---|
| | RS | Data | RS | Data |
| N, N, N | 1 | 1 | 0 | 0 |
| N, N, A | 1 | −j | 0 | 0 |
| N, A, N | 1 | −1 | 0 | 0 |
| N, A, A | 1 | j | 0 | 0 |
| A, N, N | 0 | 0 | 1 | 1 |
| A, N, A | 0 | 0 | 1 | −j |
| A, A, N | 0 | 0 | 1 | −1 |
| A, A, A | 0 | 0 | 1 | j |

Table 19 illustrates an exemplary case where 1-bit SR information and 3-bit ACK/NACK information are simultaneously transmitted by enhanced channel selection.

TABLE 19

| SR | ACK/NACK | Ch1 | | Ch2 | |
|---|---|---|---|---|---|
| | | RS | Data | RS | Data |
| 0 | N, N, N | 1 | 1 | 0 | 0 |
| 0 | N, N, A | 1 | −j | 0 | 0 |
| 0 | N, A, N | 1 | −1 | 0 | 0 |
| 0 | N, A, A | 1 | j | 0 | 0 |
| 0 | A, N, N | 0 | 0 | 1 | 1 |
| 0 | A, N, A | 0 | 0 | 1 | −j |
| 0 | A, A, N | 0 | 0 | 1 | −1 |
| 0 | A, A, A | 0 | 0 | 1 | j |
| 1 | N, N, N | 1 | 0 | 0 | 1 |
| 1 | N, N, A | 1 | 0 | 0 | −j |
| 1 | N, A, N | 1 | 0 | 0 | −1 |
| 1 | N, A, A | 1 | 0 | 0 | j |

TABLE 19-continued

| | | Ch1 | | Ch2 | |
|---|---|---|---|---|---|
| SR | ACK/NACK | RS | Data | RS | Data |
| 1 | A, N, N | 0 | 1 | 1 | 0 |
| 1 | A, N, A | 0 | -j | 1 | 0 |
| 1 | A, A, N | 0 | -1 | 1 | 0 |
| 1 | A, A, A | 0 | j | 1 | 0 |

If the transmission bit of the SR information is '0' indicating that the UE requests no resources to the BS, the same transmission bits as in the case of transmitting 3-bit ACK/NACK information in Table 18 are transmitted. On the contrary, if the transmission bit of the SR information is '1' indicating that the UE requests resources to the BS, the 1-bit SR information may be additionally represented by transmitting an RS allocated to a resource corresponding to PUCCH resource #0 in a resource corresponding to PUCCH resource #1 and transmitting an RS allocated to the resource corresponding to PUCCH resource #1 in the resource corresponding to PUCCH resource #0, while keeping transmission of ACK/NACK information in the same resources, PUCCH resource #0 and PUCCH resource #1.

Table 20 illustrates another exemplary case where 1-bit SR information and 3-bit ACK/NACK information are transmitted simultaneously by enhanced channel selection according to a seventh embodiment of the present invention.

TABLE 20

| | | Ch1 | | Ch2 | |
|---|---|---|---|---|---|
| SR | ACK/NACK | RS | Data | RS | Data |
| 0 | N, N, N | 1 | 1 | 0 | 0 |
| 0 | N, N, A | 1 | -j | 0 | 0 |
| 0 | N, A, N | 1 | -1 | 0 | 0 |
| 0 | N, A, A | 1 | j | 0 | 0 |
| 0 | A, N, N | 0 | 0 | 1 | 1 |
| 0 | A, N, A | 0 | 0 | 1 | -j |
| 0 | A, A, N | 0 | 0 | 1 | -1 |
| 0 | A, A, A | 0 | 0 | 1 | j |
| 1 | N, N, N | 1 | 0 | 0 | 1 |
| 1 | N, N, A | 1 | 0 | 0 | -j |
| 1 | N, A, N | 1 | 0 | 0 | -1 |
| 1 | N, A, A | 1 | 0 | 0 | j |
| 1 | A, N, N | 0 | 1 | 1 | 0 |
| 1 | A, N, A | 0 | -j | 1 | 0 |
| 1 | A, A, N | 0 | -1 | 1 | 0 |
| 1 | A, A, A | 0 | j | 1 | 0 |

If the transmission bit of the SR information is '0' indicating that the UE requests no resources to the B, the same transmission bits as in the case of transmitting 3-bit ACK/NACK information in Table 18 are transmitted. On the contrary, if the transmission bit of the SR information is '1' indicating that the UE requests resources to the BS, the 1-bit SR information may be additionally represented by exchanging PUCCH resource #0 with PUCCH resource #1 for the transmission bits of ACK/NACK information transmitted in PUCCH resource #1 and PUCCH resource #0, while keeping transmission of SR information in the same resources, PUCCH resource #0 and PUCCH resource #1.

Table 21 illustrates another exemplary case where 1-bit SR information and 3-bit ACK/NACK information are transmitted simultaneously.

TABLE 21

| | | Ch1 | | Ch2 | |
|---|---|---|---|---|---|
| SR | ACK/NACK | RS | Data | RS | Data |
| 0 | N, N, N | 1 | 1 | 0 | 0 |
| 0 | N, N, A | 1 | -j | 0 | 0 |
| 0 | N, A, N | 1 | j | 0 | 0 |
| 0 | N, A, A | 1 | -1 | 0 | 0 |
| 0 | A, N, N | 0 | 1 | 1 | 0 |
| 0 | A, N, A | 0 | -j | 1 | 0 |
| 0 | A, A, N | 0 | j | 1 | 0 |
| 0 | A, A, A | 0 | -1 | 1 | 0 |
| 1 | N, N, N | 1 | 0 | 0 | 1 |
| 1 | N, N, A | 1 | 0 | 0 | -j |
| 1 | N, A, N | 1 | 0 | 0 | j |
| 1 | N, A, A | 1 | 0 | 0 | -1 |
| 1 | A, N, N | 0 | 0 | 1 | 1 |
| 1 | A, N, A | 0 | 0 | 1 | -j |
| 1 | A, A, N | 0 | 0 | 1 | j |
| 1 | A, A, A | 0 | 0 | 1 | -1 |

Table 22 illustrates another exemplary case where 4-bit ACK/NACK information is transmitted by channel selection.

TABLE 22

| | Ch1 | | Ch2 | | Ch3 | | Ch4 | |
|---|---|---|---|---|---|---|---|---|
| A/N | RS | Data | RS | Data | RS | Data | RS | Data |
| N, N, N, N | 1 | 1 | 0 | 0 | 0 | 0 | 0 | 0 |
| N, N, N, A | 1 | -j | 0 | 0 | 0 | 0 | 0 | 0 |
| N, N, A, N | 1 | j | 0 | 0 | 0 | 0 | 0 | 0 |
| N, N, A, A | 1 | -1 | 0 | 0 | 0 | 0 | 0 | 0 |
| N, A, N, N | 0 | 0 | 1 | 1 | 0 | 0 | 0 | 0 |
| N, A, N, A | 0 | 0 | 1 | -j | 0 | 0 | 0 | 0 |
| N, A, A, N | 0 | 0 | 1 | j | 0 | 0 | 0 | 0 |
| N, A, A, A | 0 | 0 | 1 | -1 | 0 | 0 | 0 | 0 |
| A, N, N, N | 0 | 0 | 0 | 0 | 1 | 1 | 0 | 0 |
| A, N, N, A | 0 | 0 | 0 | 0 | 1 | -j | 0 | 0 |
| A, N, A, N | 0 | 0 | 0 | 0 | 1 | j | 0 | 0 |
| A, N, A, A | 0 | 0 | 0 | 0 | 1 | -1 | 0 | 0 |
| A, A, N, N | 0 | 0 | 0 | 0 | 0 | 0 | 1 | 1 |
| A, A, N, A | 0 | 0 | 0 | 0 | 0 | 0 | 1 | -j |
| A, A, A, N | 0 | 0 | 0 | 0 | 0 | 0 | 1 | j |

A method for simultaneously transmitting 1-bit SR information and 4-bit ACK/NACK information are transmitted simultaneously by enhanced channel selection according to an eighth embodiment of the present invention will be described.

Table 23 illustrates an example of configuring three PUCCH resources and transmitting 1-bit SR information and 4-bit ACK/NACK information by enhanced channel selection.

TABLE 23

| | | Ch1 | | Ch2 | | Ch3 | |
|---|---|---|---|---|---|---|---|
| SR | A/N | RS | Data | RS | Data | RS | Data |
| 0 | N, N, N, N | 1 | 1 | 0 | 0 | 0 | 0 |
| 0 | N, N, N, A | 1 | -j | 0 | 0 | 0 | 0 |
| 0 | N, N, A, N | 1 | j | 0 | 0 | 0 | 0 |
| 0 | N, N, A, A | 1 | -1 | 0 | 0 | 0 | 0 |
| 0 | N, A, N, N | 1 | 0 | 0 | 1 | 0 | 0 |
| 0 | N, A, N, A | 1 | 0 | 0 | -j | 0 | 0 |
| 0 | N, A, A, N | 1 | 0 | 0 | j | 0 | 0 |
| 0 | N, A, A, A | 1 | 0 | 0 | -1 | 0 | 0 |
| 0 | A, N, N, N | 0 | 0 | 1 | 0 | 0 | 1 |
| 0 | A, N, N, A | 0 | 0 | 1 | 0 | 0 | -j |
| 0 | A, N, A, N | 0 | 0 | 1 | 0 | 0 | j |
| 0 | A, N, A, A | 0 | 0 | 1 | 0 | 0 | -1 |

TABLE 23-continued

| | | Ch1 | | Ch2 | | Ch3 | |
|---|---|---|---|---|---|---|---|
| SR | A/N | RS | Data | RS | Data | RS | Data |
| 0 | A, A, N, N | 0 | 0 | 1 | 1 | 0 | 0 |
| 0 | A, A, N, A | 0 | 0 | 1 | −j | 0 | 0 |
| 0 | A, A, A, N | 0 | 0 | 1 | j | 0 | 0 |
| 0 | A, A, A, A | 0 | 0 | 1 | −1 | 0 | 0 |
| 1 | N, N, N, N | 1 | 0 | 0 | 0 | 0 | 1 |
| 1 | N, N, N, A | 1 | 0 | 0 | 0 | 0 | −j |
| 1 | N, N, A, N | 1 | 0 | 0 | 0 | 0 | j |
| 1 | N, N, A, A | 1 | 0 | 0 | 0 | 0 | −1 |
| 1 | N, A, N, N | 0 | 1 | 0 | 0 | 1 | 0 |
| 1 | N, A, N, A | 0 | −j | 0 | 0 | 1 | 0 |
| 1 | N, A, A, N | 0 | j | 0 | 0 | 1 | 0 |
| 1 | N, A, A, A | 0 | −1 | 0 | 0 | 1 | 0 |
| 1 | A, N, N, N | 0 | 0 | 0 | 0 | 1 | 1 |
| 1 | A, N, N, A | 0 | 0 | 0 | 0 | 1 | −j |
| 1 | A, N, A, N | 0 | 0 | 0 | 0 | 1 | j |
| 1 | A, N, A, A | 0 | 0 | 0 | 0 | 1 | −1 |

Table 24 illustrates an example of configuring four PUCCH resources and transmitting 1-bit SR information and 4-bit ACK/NACK information by enhanced channel selection.

TABLE 24

| | | Ch1 | | Ch2 | | Ch3 | | Ch4 | |
|---|---|---|---|---|---|---|---|---|---|
| SR | A/N | RS | Data | RS | Data | RS | Data | RS | Data |
| 0 | N, N, N, N | 1 | 1 | 0 | 0 | 0 | 0 | 0 | 0 |
| 0 | N, N, N, A | 1 | −j | 0 | 0 | 0 | 0 | 0 | 0 |
| 0 | N, N, A, N | 1 | j | 0 | 0 | 0 | 0 | 0 | 0 |
| 0 | N, N, A, A | 1 | −1 | 0 | 0 | 0 | 0 | 0 | 0 |
| 0 | N, A, N, N | 0 | 0 | 1 | 1 | 0 | 0 | 0 | 0 |
| 0 | N, A, N, A | 0 | 0 | 1 | −j | 0 | 0 | 0 | 0 |
| 0 | N, A, A, N | 0 | 0 | 1 | j | 0 | 0 | 0 | 0 |
| 0 | N, A, A, A | 0 | 0 | 1 | −1 | 0 | 0 | 0 | 0 |
| 0 | A, N, N, N | 0 | 0 | 0 | 0 | 1 | 1 | 0 | 0 |
| 0 | A, N, N, A | 0 | 0 | 0 | 0 | 1 | −j | 0 | 0 |
| 0 | A, N, A, N | 0 | 0 | 0 | 0 | 1 | j | 0 | 0 |
| 0 | A, N, A, A | 0 | 0 | 0 | 0 | 1 | −1 | 0 | 0 |
| 0 | A, A, N, N | 0 | 0 | 0 | 0 | 0 | 0 | 1 | 1 |
| 0 | A, A, N, A | 0 | 0 | 0 | 0 | 0 | 0 | 1 | −j |
| 0 | A, A, A, N | 0 | 0 | 0 | 0 | 0 | 0 | 1 | j |

If the transmission bit of the SR information is '0' indicating that the UE requests no resources (or no scheduling) to the B, the same transmission bits as in the case of transmitting 4-bit ACK/NACK information in Table 22 are transmitted. On the contrary, if the transmission bit of the SR information is '1' indicating that the UE requests resources to the BS, the 1-bit SR information may be additionally represented by exchanging PUCCH resource #0 with PUCCH resource #1 for the transmission bits of ACK/NACK information transmitted in PUCCH resource #1 and PUCCH resource #0, while keeping transmission of SR information in PUCCH resource #0 and PUCCH resource #1, and exchanging PUCCH resource #3 with PUCCH resource #4 for the transmission bits of ACK/NACK information transmitted in PUCCH resource #4 and PUCCH resource #3, while keeping transmission of SR information in PUCCH resource #3 and PUCCH resource #4. Since two cases can be additionally represented in 1 bit in this manner, 1-bit SR information and 4-bit ACK/NACK information can be transmitted simultaneously.

While it has been described in this embodiment that the transmission bits of ACK/NACK information are exchanged between PUCCH resource #1 and PUCCH resource #2 and between PUCCH resource #3 and PUCCH resource #4, by way of example, the same principle can be maintained by exchanging resources in which RSs corresponding to the PUCCH resources are transmitted, instead of the PUCCH resources.

Table 25 illustrates another example of transmitting 1-bit SR information and 4-bit ACK/NACK information by enhanced channel selection.

TABLE 25

| | | Ch1 | | Ch2 | | Ch3 | | Ch4 | |
|---|---|---|---|---|---|---|---|---|---|
| SR | A/N | RS | Data | RS | Data | RS | Data | RS | Data |
| 0 | N, N, N, N | 1 | 1 | 0 | 0 | 0 | 0 | 0 | 0 |
| 0 | N, N, N, A | 1 | −j | 0 | 0 | 0 | 0 | 0 | 0 |
| 0 | N, N, A, N | 1 | j | 0 | 0 | 0 | 0 | 0 | 0 |
| 0 | N, N, A, A | 1 | −1 | 0 | 0 | 0 | 0 | 0 | 0 |
| 0 | N, A, N, N | 0 | 0 | 1 | 1 | 0 | 0 | 0 | 0 |
| 0 | N, A, N, A | 0 | 0 | 1 | −j | 0 | 0 | 0 | 0 |
| 0 | N, A, A, N | 0 | 0 | 1 | j | 0 | 0 | 0 | 0 |
| 0 | N, A, A, A | 0 | 0 | 1 | −1 | 0 | 0 | 0 | 0 |
| 0 | A, N, N, N | 0 | 0 | 0 | 0 | 1 | 1 | 0 | 0 |
| 0 | A, N, N, A | 0 | 0 | 0 | 0 | 1 | −j | 0 | 0 |
| 0 | A, N, A, N | 0 | 0 | 0 | 0 | 1 | j | 0 | 0 |
| 0 | A, N, A, A | 0 | 0 | 0 | 0 | 1 | −1 | 0 | 0 |
| 0 | A, A, N, N | 0 | 0 | 0 | 0 | 0 | 0 | 1 | 1 |
| 0 | A, A, N, A | 0 | 0 | 0 | 0 | 0 | 0 | 1 | −j |
| 0 | A, A, A, N | 0 | 0 | 0 | 0 | 0 | 0 | 1 | j |
| 0 | A, A, A, A | 0 | 0 | 0 | 0 | 0 | 0 | 1 | −1 |
| 1 | N, N, N, N | 0 | 1 | 1 | 0 | 0 | 0 | 0 | 0 |
| 1 | N, N, N, A | 0 | −j | 1 | 0 | 0 | 0 | 0 | 0 |
| 1 | N, N, A, N | 0 | j | 1 | 0 | 0 | 0 | 0 | 0 |
| 1 | N, N, A, A | 0 | −1 | 1 | 0 | 0 | 0 | 0 | 0 |
| 1 | N, A, N, N | 0 | 0 | 0 | 1 | 1 | 0 | 0 | 0 |
| 1 | N, A, N, A | 0 | 0 | 0 | −j | 1 | 0 | 0 | 0 |
| 1 | N, A, A, N | 0 | 0 | 0 | j | 1 | 0 | 0 | 0 |
| 1 | N, A, A, A | 0 | 0 | 0 | −1 | 1 | 0 | 0 | 0 |
| 1 | A, N, N, N | 0 | 0 | 0 | 0 | 0 | 1 | 1 | 0 |
| 1 | A, N, N, A | 0 | 0 | 0 | 0 | 0 | −j | 1 | 0 |
| 1 | A, N, A, N | 0 | 0 | 0 | 0 | 0 | j | 1 | 0 |
| 1 | A, N, A, A | 0 | 0 | 0 | 0 | 0 | −1 | 1 | 0 |
| 1 | A, A, N, N | 1 | 0 | 0 | 0 | 0 | 0 | 0 | 1 |
| 1 | A, A, N, A | 1 | 0 | 0 | 0 | 0 | 0 | 0 | −j |
| 1 | A, A, A, N | 1 | 0 | 0 | 0 | 0 | 0 | 0 | j |
| 1 | A, A, A, A | 1 | 0 | 0 | 0 | 0 | 0 | 0 | −1 |

Table 25 is identical to Table 24, when the transmission bit of the SR information is '0'. When the transmission bit of the SR information is '1' indicating that the UE requests resources to the BS, the resources carrying RSs corresponding to the PUCCH resources in Table 24 are cyclically shifted by 1, while the PUCCH resources illustrated in Table 24 are still kept in Table 25.

Table 26 illustrates another example of simultaneously transmitting 1-bit SR information and 4-bit ACK/NACK information by enhanced channel selection.

According to Table 23, three PUCCH resources are sufficient for simultaneous transmission of 4-bit ACK/NACK information and 1-bit SR information by enhanced channel selection. However, while PUCCH resources are mapped to QPSK complex-valued modulation symbols in Table 23, the PUCCH resources are mapped to BPSK complex-valued modulation symbols in Table 26.

TABLE 26

| | | Ch1 | | Ch2 | | Ch3 | | Ch4 | |
|---|---|---|---|---|---|---|---|---|---|
| SR | A/N | RS | Data | RS | Data | RS | Data | RS | Data |
| 0 | N, N, N, N | 1 | 1 | 0 | 0 | 0 | 0 | 0 | 0 |
| 0 | N, N, N, A | 1 | −1 | 0 | 0 | 0 | 0 | 0 | 0 |
| 0 | N, N, A, N | 0 | 0 | 1 | 1 | 0 | 0 | 0 | 0 |

TABLE 26-continued

| SR | A/N | Ch1 RS | Ch1 Data | Ch2 RS | Ch2 Data | Ch3 RS | Ch3 Data | Ch4 RS | Ch4 Data |
|---|---|---|---|---|---|---|---|---|---|
| 0 | N, N, A, A | 0 | 0 | 1 | −1 | 0 | 0 | 0 | 0 |
| 0 | N, A, N, N | 0 | 0 | 0 | 0 | 1 | 1 | 0 | 0 |
| 0 | N, A, N, A | 0 | 0 | 0 | 0 | 1 | −1 | 0 | 0 |
| 0 | N, A, A, N | 0 | 0 | 0 | 0 | 0 | 0 | 1 | 1 |
| 0 | N, A, A, A | 0 | 0 | 0 | 0 | 0 | 0 | 1 | −1 |
| 0 | A, N, N, N | 0 | 1 | 1 | 0 | 0 | 0 | 0 | 0 |
| 0 | A, N, N, A | 0 | −1 | 1 | 0 | 0 | 0 | 0 | 0 |
| 0 | A, N, A, N | 0 | 0 | 0 | 1 | 1 | 0 | 0 | 0 |
| 0 | A, N, A, A | 0 | 0 | 0 | −1 | 1 | 0 | 0 | 0 |
| 0 | A, A, N, N | 0 | 0 | 0 | 0 | 0 | 1 | 1 | 0 |
| 0 | A, A, N, A | 0 | 0 | 0 | 0 | 0 | −1 | 1 | 0 |
| 0 | A, A, A, N | 1 | 0 | 0 | 0 | 0 | 0 | 0 | 1 |
| 0 | A, A, A, A | 1 | 0 | 0 | 0 | 0 | 0 | 0 | −1 |
| 1 | N, N, N, N | 0 | 1 | 0 | 0 | 1 | 0 | 0 | 0 |
| 1 | N, N, N, A | 0 | −1 | 0 | 0 | 1 | 0 | 0 | 0 |
| 1 | N, N, A, N | 0 | 0 | 0 | 1 | 0 | 0 | 1 | 0 |
| 1 | N, N, A, A | 0 | 0 | 0 | −1 | 0 | 0 | 1 | 0 |
| 1 | N, A, N, N | 1 | 0 | 0 | 0 | 0 | 1 | 0 | 0 |
| 1 | N, A, N, A | 1 | 0 | 0 | 0 | 0 | −1 | 0 | 0 |
| 1 | N, A, A, N | 0 | 0 | 1 | 0 | 0 | 0 | 0 | 1 |
| 1 | N, A, A, A | 0 | 0 | 1 | 0 | 0 | 0 | 0 | −1 |
| 1 | A, N, N, N | 0 | 1 | 0 | 0 | 0 | 0 | 1 | 0 |
| 1 | A, N, N, A | 0 | −1 | 0 | 0 | 0 | 0 | 1 | 0 |
| 1 | A, N, A, N | 1 | 0 | 0 | 1 | 0 | 0 | 0 | 0 |
| 1 | A, N, A, A | 1 | 0 | 0 | −1 | 0 | 0 | 0 | 0 |
| 1 | A, A, N, N | 0 | 0 | 1 | 0 | 0 | 1 | 0 | 0 |
| 1 | A, A, N, A | 0 | 0 | 1 | 0 | 0 | −1 | 0 | 0 |
| 1 | A, A, A, N | 0 | 0 | 0 | 0 | 1 | 0 | 0 | 1 |
| 1 | A, A, A, A | 0 | 0 | 0 | 0 | 1 | 0 | 0 | −1 |

FIG. 35 illustrates an operation for configuring a PUCCH format according to an embodiment of the present invention, specifically Table 26.

Transmission bits to be transmitted in PUCCH resources are modulated, 1 bit or 2 bits each time depending on whether BPSK or QPSK is adopted. An additional transmission bit may be represented by combining each PUCCH resource with a resource carrying an RS corresponding to the PUCCH resource.

Referring to Table 26, four PUCCH resources, PUCCH resource #0 to PUCCH resource #3 and resources carrying RSs corresponding to the four PUCCH resources, i.e. resources corresponding to PUCCH resource #0 to PUCCH resource #3 may be defined. That is, 16 (=4×4) cases can be represented in 4 bits depending on PUCCH resources carrying UCI and resources carrying RSs, corresponding to the PUCCH resources.

Referring to FIG. 35, basically, a resource carrying an RS corresponding to a PUCCH resource has an index plus an offset of 1. If available resources carrying RSs are all used by increasing a resource index by an offset of 1, the starting index of a resource carrying an RS is increased by a starting resource offset of 1. All ACK/NACK states are mapped, while these two types of offsets are increased. Herein, the index of a PUCCH resource carrying UCI is increased by an offset of 1. When all PUCCH resources are used by increasing the PUCCH resource index by an offset of 1, mapping begins again with the starting PUCCH resource index.

For example, when PUCCH resources are changed in the order of PUCCH resource #0→PUCCH resource #1→PUCCH resource #2→PUCCH resource #3, resources carrying RSs are changed in the order of resource #0→resource #1→resource #2→resource #3. Then if the PUCCH resources are changed in the same order of PUCCH resource #0→PUCCH resource #1→PUCCH resource #2→PUCCH resource #3, the resources carrying RSs may be changed in the order of resource #1→resource #2→resource #3→resource #4, then in the order of resource #2→resource #3→resource #0→resource #1, and then in the order of resource #4→resource #0→resource #1→resource #2.

Meanwhile, control information may be transmitted by changing PUCCH resources in the above manner, while fixing the order of changing resources carrying RSs corresponding to the PUCCH resources. It is obviously to be understood that 1-bit SR information and 4-bit ACK/NACK information can be represented in various manners.

When 1-bit SR information and 2-bit ACK/NACK information are to be transmitted simultaneously, an embodiment using enhanced channel selection through BPSK as well as an embodiment using channel selection through QPSK can be applied.

An example of simultaneously transmitting 1-bit SR information and 2-bit ACK/NACK information by channel selection or enhanced channel selection according to a ninth embodiment of the present invention will be described below.

Table 27 illustrates an example of simultaneously transmitting 2-bit ACK/NACK information and 1-bit SR information by channel selection. Especially, the 1-bit SR information is located at the start of the transmission bits, that is, the MSB of the transmission bits and the SR information is distinguished by a PUCCH resource.

TABLE 27

| SR | ACK/NACK | Ch1 RS | Ch1 Data | Ch2 RS | Ch2 Data |
|---|---|---|---|---|---|
| 0 | N, N | 1 | 1 | 0 | 0 |
| 0 | N, A | 1 | −j | 0 | 0 |
| 0 | A, N | 1 | j | 0 | 0 |
| 0 | A, A | 1 | −1 | 0 | 0 |
| 1 | N, N | 0 | 0 | 1 | 1 |
| 1 | N, A | 0 | 0 | 1 | −j |
| 1 | A, N | 0 | 0 | 1 | j |
| 1 | A, A | 0 | 0 | 1 | −1 |

Table 28 illustrates an example of simultaneously transmitting 2-bit ACK/NACK information and 1-bit SR information by enhanced channel selection. Especially, the 1-bit SR information is located at the start of the transmission bits, that is, the MSB of the transmission bits and the SR information is distinguished by a PUCCH resource.

TABLE 28

| SR | ACK/NACK | Ch1 RS | Ch1 Data | Ch2 RS | Ch2 Data |
|---|---|---|---|---|---|
| 0 | N, N | 1 | 1 | 0 | 0 |
| 0 | N, A | 1 | −1 | 0 | 0 |
| 0 | A, N | 0 | 1 | 1 | 0 |
| 0 | A, A | 0 | −1 | 1 | 0 |
| 1 | N, N | 1 | 0 | 0 | 1 |
| 1 | N, A | 1 | 0 | 0 | −1 |
| 1 | A, N | 0 | 0 | 1 | 1 |
| 1 | A, A | 0 | 0 | 1 | −1 |

According to a tenth embodiment of the present invention, channel selection may be used on a slot basis. The number of cases is increased by selecting different PUCCH resources between the slots of a subframe. As described before, a PUCCH is allocated to an RB pair in one subframe and frequency-hops between the two slots of the subframe. Therefore, once a PUCCH resource is determined in a first slot, a PUCCH resource is determined in a second slot. However, channel selection is a method for increasing the number of transmission bits that can be represented by considering the first and second slots separately and thus selecting PUCCH resources in the first and second slots independently.

The above-described embodiments of the present invention can be implemented to transmit various types of UCI. The number of bits of SR information and the number of bits of ACK/NACK information may vary based on the same principle. In addition, other control information transmission methods can be contemplated by combining a plurality of embodiments. Obviously, transmission bits according to an embodiment of the present invention can be applied to transmission of control information according to various embodiments of the present invention.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship among a BS and a UE. In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term, fixed station, Node B, 'eNode B (eNB), access point, etc. The term 'terminal' may be replaced with the term, UE, MS, Mobile Subscriber Station (MSS), etc.

The embodiments of the present invention may be achieved by various means, for example, hardware, firmware, software, or a combination thereof. In a hardware configuration, an embodiment of the present invention may be achieved by one or more ASICs, DSPs, DSDPs, PLDs, FPGAs, processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a UE, a BS, or any other equipment in a wireless communication system and, more particularly, to a method and apparatus for transmitting control information.

The invention claimed is:

1. A method for transmitting, by a user equipment, uplink control information in a wireless communication system, the method comprising:

receiving, from a base station, a plurality of PDCCHs (physical downlink control channels) on a plurality of downlink cells configured for the user equipment; and if the user equipment has a scheduling request to the base station, transmitting, to the base station, ACK/NACK information associated with the plurality of PDCCHs on a SR PUCCH (scheduling request physical uplink control channel) resource to send the ACK/NACK information and a positive scheduling request within a subframe, wherein the ACK/NACK information includes 2-bit information indicating a number of ACKs among ACK/NACKs for the plurality of PDCCHs received on the plurality of downlink cells configured for the user equipment, wherein if the number of ACKs is 0 or at least one discontinuous transmission (DTX) occurs, the number of ACKs is represented by transmission bits '0,0', and otherwise, the number of ACKs is represented by transmission bits '1,1', transmission bits '1,0' or transmission bits '0,1', wherein each of the transmission bits '1,1', the transmission bits '1,0' and the transmission bits '0,1', differently corresponds to three numbers for the number of ACKs, and wherein the number of ACKs is represented by the transmission bits '1,1' when the number of ACKs is 1, 4 or 7, the number of ACKs is represented by the transmission bits '1,0' when the number of ACKs is 2, 5 or 8, and the number of ACKs is represented by the transmission bits '0,1' when the number of ACKs is 3, 6 or 9.

2. The method of claim 1, wherein the information indicating the number of ACKs is transmitted on the SR PUCCH resource using PUCCH format 1b.

3. The method of claim 1, wherein the number of ACKs is determined based on downlink assignment indexes for the plurality of downlink cells.

4. The method of claim 1, wherein if a number of PDCCHs, which is indicated by a downlink assignment index received on a downlink cell from among the plurality of downlink cells, is different from a number of PDCCHs detected by the user equipment on the downlink cell, the transmission bits '0,0' is transmitted.

5. A user equipment of transmitting uplink control information in a wireless communication system, the user equipment comprising:

a transmitter;

a receiver; and a processor configured to control the receiver to receive a plurality of PDCCHs (physical downlink control channels) on a plurality of downlink cells configured for the user equipment from a base station, and if the user equipment has a scheduling request to the base station, control the transmitter to transmit ACK/NACK information associated with the plurality of PDCCHs on a SR PUCCH (scheduling request physical uplink control channel) resource to send the ACK/NACK information and a positive scheduling request within a subframe, wherein the ACK/NACK information includes 2-bit information indicating a number of ACKs among ACK/NACKs for the plurality of PDCCHs received on the plurality of downlink cells configured for the user equipment, wherein if the number of ACKs is 0 or at least one discontinuous transmission (DTX) occurs, the number of ACKs is represented by transmission bits '0,0', and otherwise, the number of ACKs is represented by transmission bits '1,1', transmission bits '1,0' or transmission bits '0,1', wherein each of the transmission bits '1,1', the transmission bits '1,0' and the transmission bits '0,1' differently corresponds to three numbers for the number of ACKs, and wherein the number of ACKs is represented by the transmission bits '1,1' when the number of ACKs is 1, 4 or 7, the number of ACKs is represented by the transmission bits '1,0' when the number of ACKs is 2, 5 or 8, and the number of ACKs is represented by the transmission bits '0,1' when the number of ACKs is 3, 6 or 9.

6. The user equipment of claim 5, wherein the processor is configured to control the transmitter to transmit the information indicating the number of ACKs on the SR PUCCH resource using PUCCH format 1b.

7. The user equipment of claim 5, wherein the processor is configured to determine the number of ACKs based on downlink assignment indexes for the plurality of downlink cells.

8. The user equipment of claim 5, wherein if a number of PDCCHs, that is indicated by a downlink assignment index received on a downlink cell from among the plurality of downlink cells, is different from a number of PDCCHs detected by the user equipment on the downlink cell, the processor is configured to control the transmitter to transmit the transmission bits '0,0'.

9. A method for receiving, by a base station equipment, uplink control information in a wireless communication system, the method comprising:

transmitting, to a user equipment, a plurality of PDCCHs (physical downlink control channels) on a plurality of downlink cells configured for the user equipment; and receiving, from the user equipment, ACK/NACK information associated with the plurality of PDCCHs on a SR PUCCH (scheduling request physical uplink control channel) resource within a subframe if there is a scheduling request from the user equipment, wherein the ACK/NACK information includes 2-bit information indicating a number of ACKs among ACK/NACKs for the plurality of PDCCHs transmitted on the plurality of downlink cells configured for the user equipment, wherein if the number of ACKs is 0 or at least one discontinuous transmission (DTX) occurs, the number of ACKs is represented by transmission bits '0,0', and otherwise, the number of ACKs is represented by transmission bits '1,1', transmission bits '1,0' or transmission bits '0,1', wherein each of the transmission bits '1,1', the transmission bits '1,0' and the transmission bits '0,1' differently corresponds to three numbers for the number of ACKs, wherein the number of ACKs is represented by the transmission bits '1,1' when the number of ACKs is 1, 4 or 7, the number of ACKs is represented by the transmission bits '1,0' when the number of ACKs is 2, 5 or 8, and the number of ACKs is represented by the transmission bits '0,1' when the number of ACKs is 3, 6 or 9.

10. The method of claim 9, wherein the information indicating the number of ACKs is received on the SR PUCCH resource using PUCCH format 1b.

11. A base station of receiving, by a base station equipment, uplink control information in a wireless communication system, the base station comprising:
a transmitter;
a receiver; and
a processor configured to control the transmitter to transmit a plurality of PDCCHs (physical downlink control channels) on a plurality of downlink cells configured for a user equipment to the user equipment, and control the receiver to receive ACK/NACK information associated with the plurality of PDCCHs on a SR PUCCH (scheduling request physical uplink control channel) resource within a subframe if there is a scheduling request from the user equipment, wherein the ACK/NACK information includes 2-bit information indicating a number of ACKs among ACK/NACKs for the plurality of PDCCHs transmitted on the plurality of downlink cells configured for the user equipment, wherein if the number of ACKs is 0 or at least one discontinuous transmission (DTX) occurs, the number of ACKs is represented by transmission bits '0,0', and otherwise, the number of ACKs is represented by transmission bits '1,1', transmission bits '1,0' or transmission bits '0,1', wherein each of the transmission bits '1,1', the transmission bits '1,0' and the transmission bits '0,1' differently corresponds to three numbers for the number of ACKs, wherein the number of ACKs is represented by the transmission bits '1,1' when the number of ACKs is 1, 4 or 7, the number of ACKs is represented by the transmission bits '1,0' when the number of ACKs is 2, 5 or 8, and the number of ACKs is represented by the transmission bits '0,1' when the number of ACKs is 3, 6 or 9.

12. The base station of claim 11, wherein the information indicating the number of ACKs is received on the SR PUCCH resource using PUCCH format 1b.

* * * * *